United States Patent
Leszczak et al.

(10) Patent No.: US 9,168,940 B1
(45) Date of Patent: Oct. 27, 2015

(54) DEVICE HAVING LEGS WHICH EXTEND AND RETRACT AND METHOD OF USE

(71) Applicants: Maciej Rafal Leszczak, Chicago, IL (US); Grzegorz Jerzy Martyniak, Hanover Park, IL (US)

(72) Inventors: Maciej Rafal Leszczak, Chicago, IL (US); Grzegorz Jerzy Martyniak, Hanover Park, IL (US)

(*) Notice: Subject to any disclaimer, the term of this patent is extended or adjusted under 35 U.S.C. 154(b) by 0 days.

(21) Appl. No.: 14/468,376

(22) Filed: Aug. 26, 2014

(51) Int. Cl.
| | |
|---|---|
| *B60S 9/00* | (2006.01) |
| *B62B 7/06* | (2006.01) |
| *A47D 1/00* | (2006.01) |
| *B60G 17/00* | (2006.01) |

(52) U.S. Cl.
CPC ... *B62B 7/06* (2013.01); *A47D 1/00* (2013.01); *B60G 17/00* (2013.01)

(58) Field of Classification Search
CPC ............... B60G 3/00; B60G 3/01; B60G 1/00
USPC ............................ 280/638, 6.15, 6.155, 6.156
See application file for complete search history.

(56) References Cited

U.S. PATENT DOCUMENTS

| | | | | |
|---|---|---|---|---|
| 4,886,288 A | * | 12/1989 | Dysarz | 280/250.1 |
| 2011/0276233 A1 | * | 11/2011 | Lofstrand | 701/49 |

\* cited by examiner

*Primary Examiner* — J. Allen Shriver, II
*Assistant Examiner* — Bryan Evans
(74) *Attorney, Agent, or Firm* — Ted Masters

(57) ABSTRACT

A device has four legs each leg having a plurality of teeth. The device further includes a body which has four gears wherein each of the four gears meshes with the teeth of a different leg. A first gear is connected to a second gear by a first shaft, and a third gear is connected to a fourth gear by a second shaft. The first gear meshes with the third gear, and the second gear meshes with the fourth gear. The legs can be selectively positioned to a retracted position adjacent to the body or to an extended position projecting away from the body. A biasing mechanism urges the four legs to the extended position. A locking mechanism locks the legs in either the retracted position or the extended position.

2 Claims, 21 Drawing Sheets

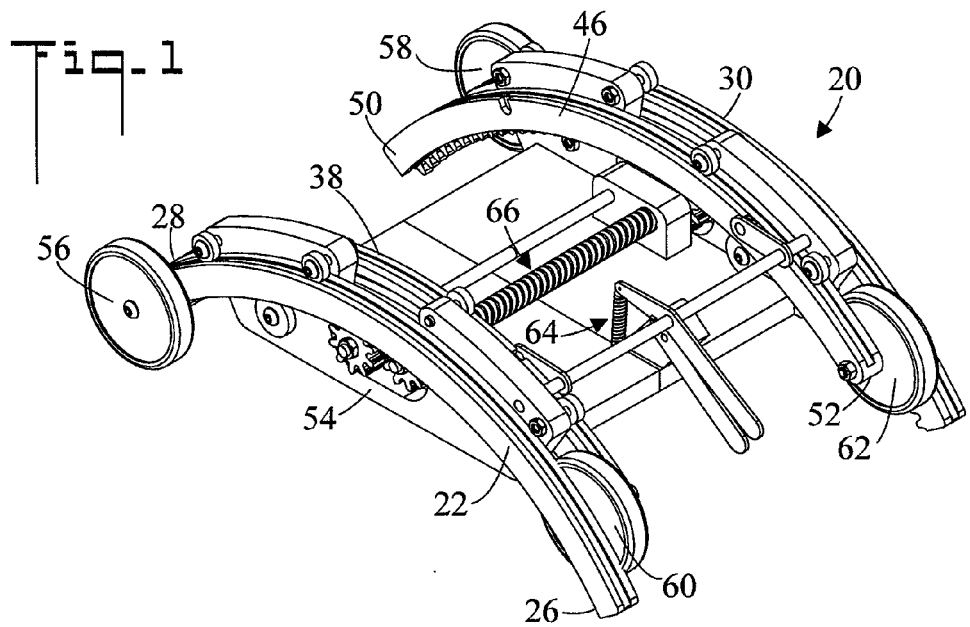
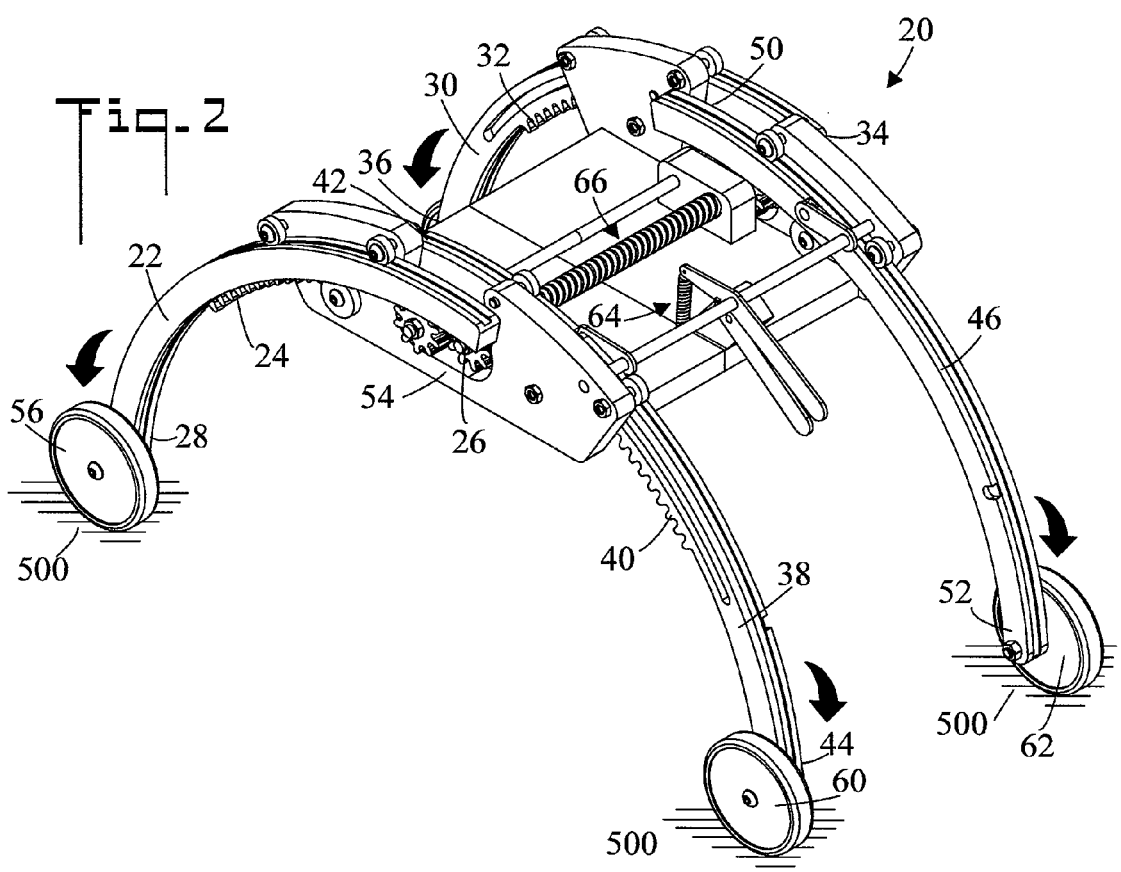

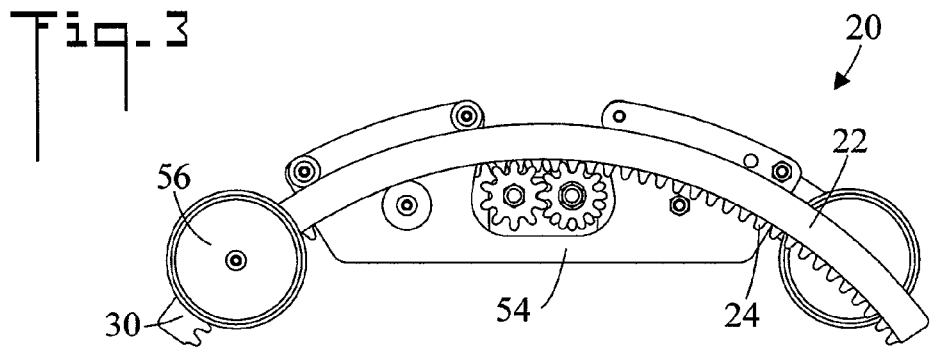
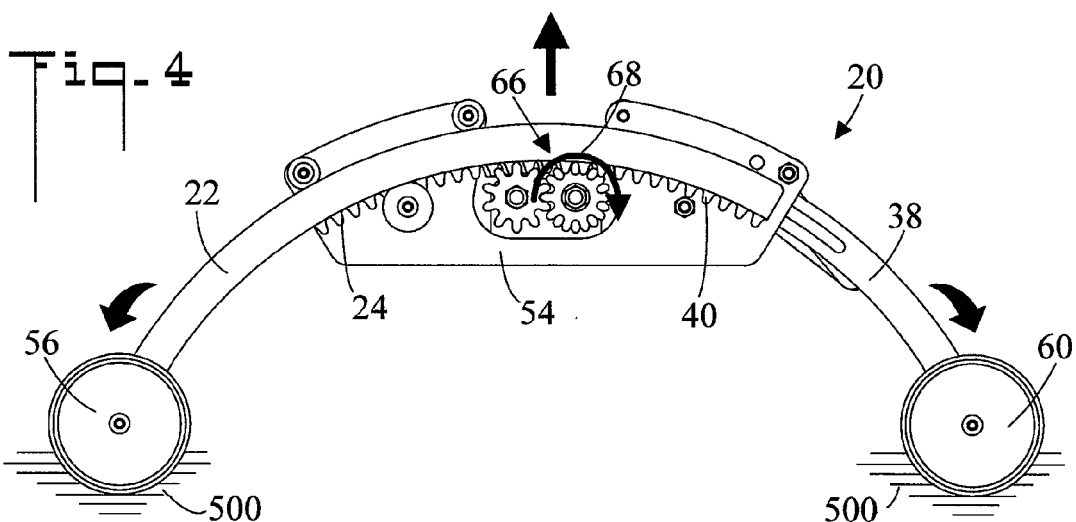
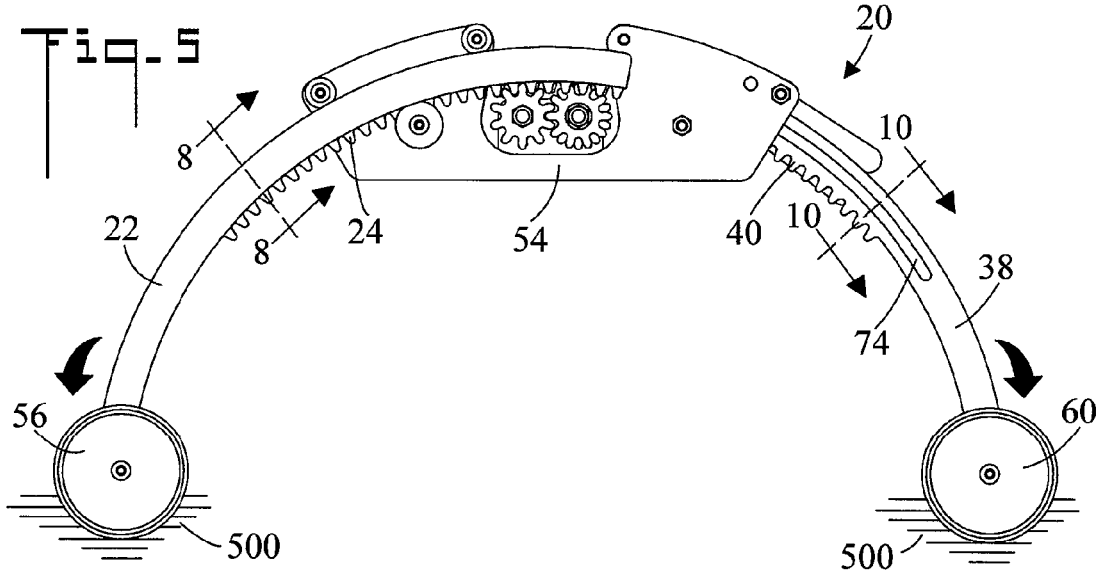

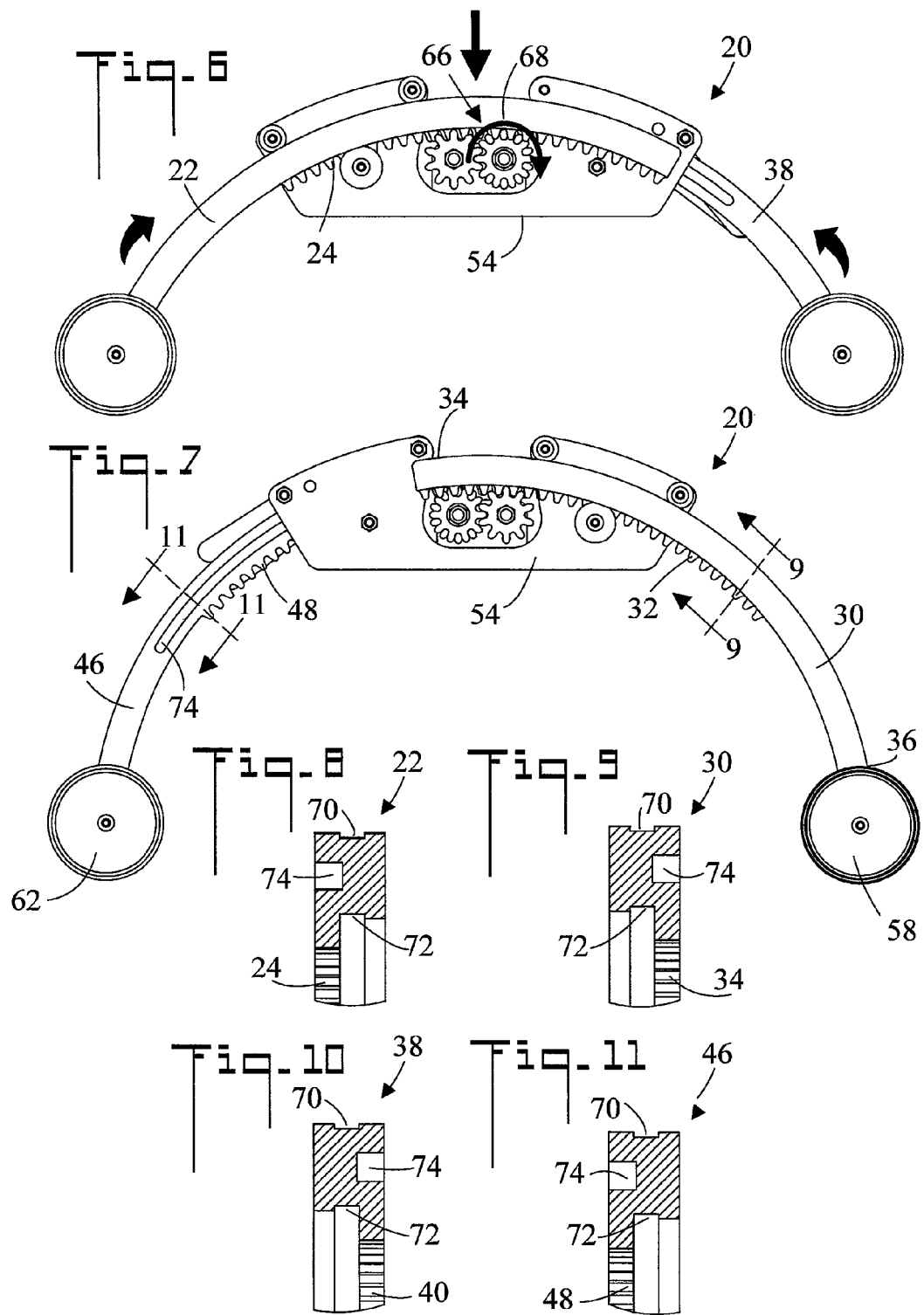

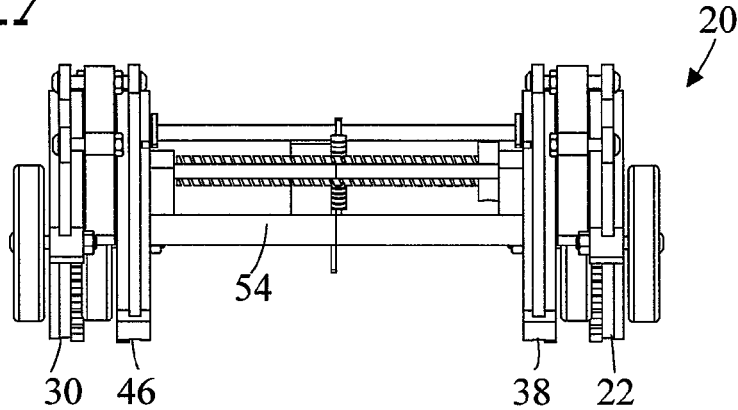
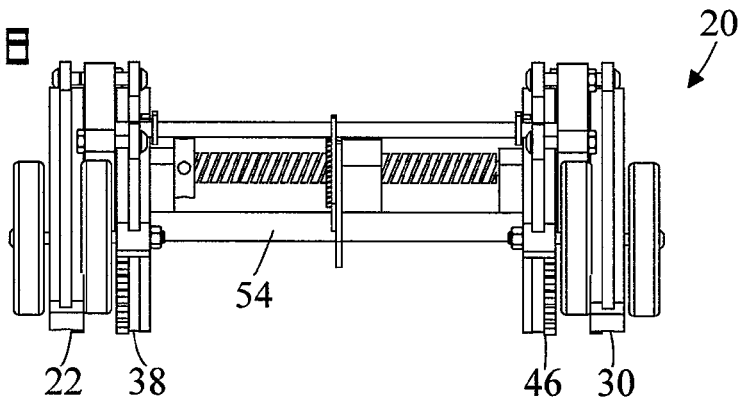
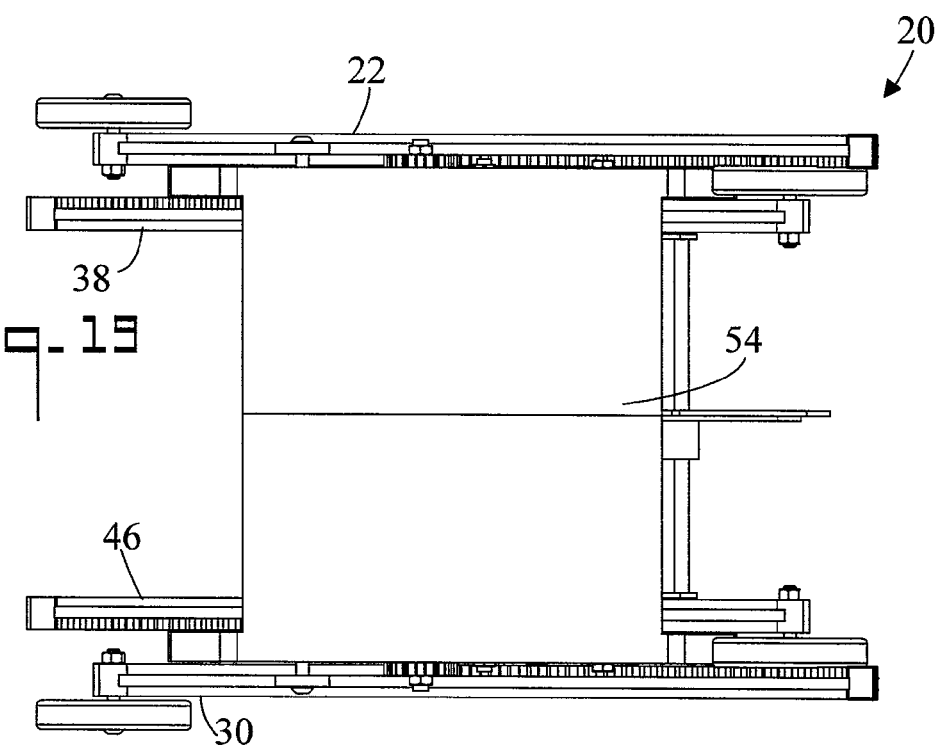

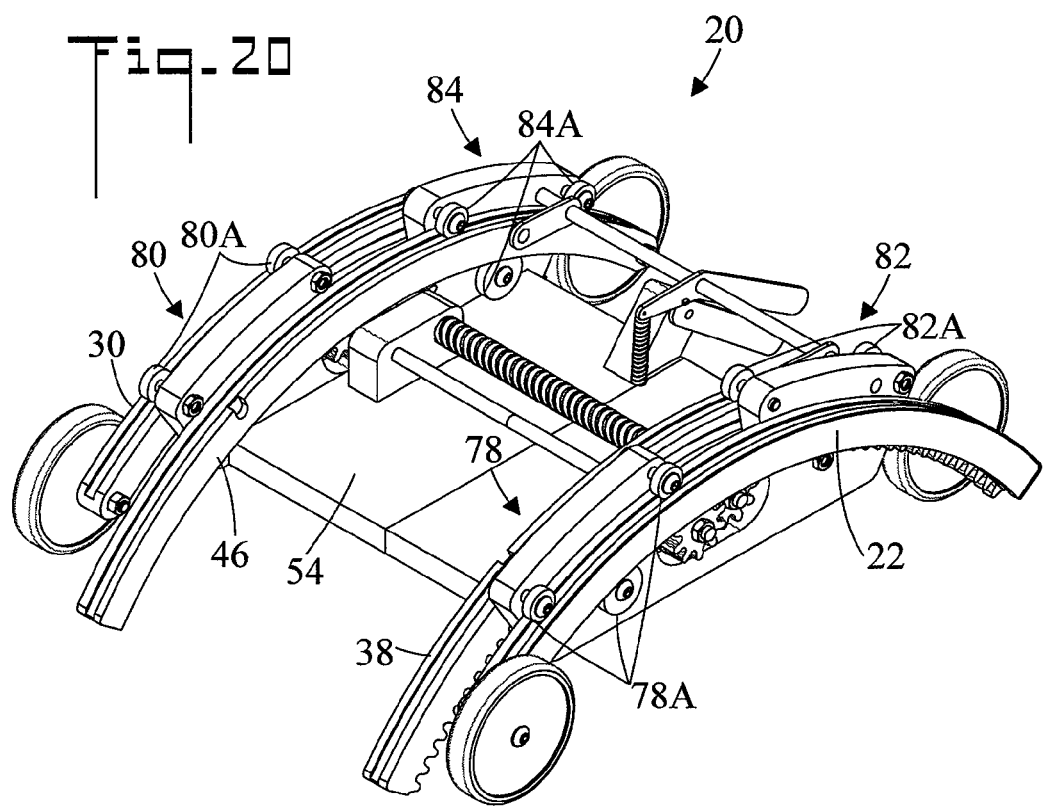

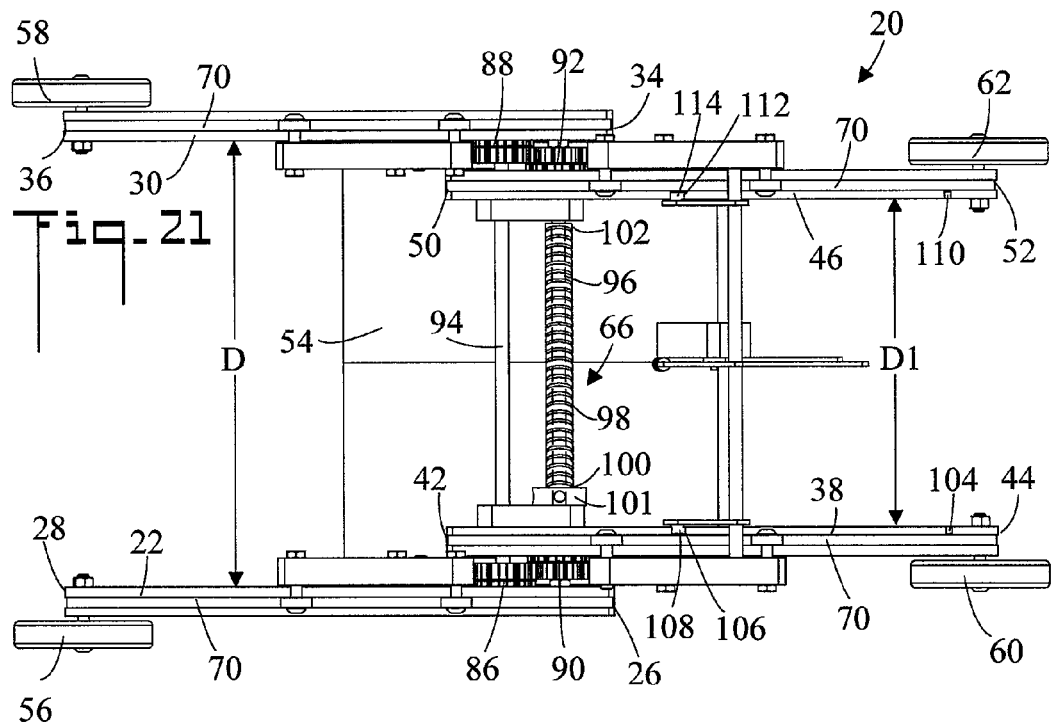
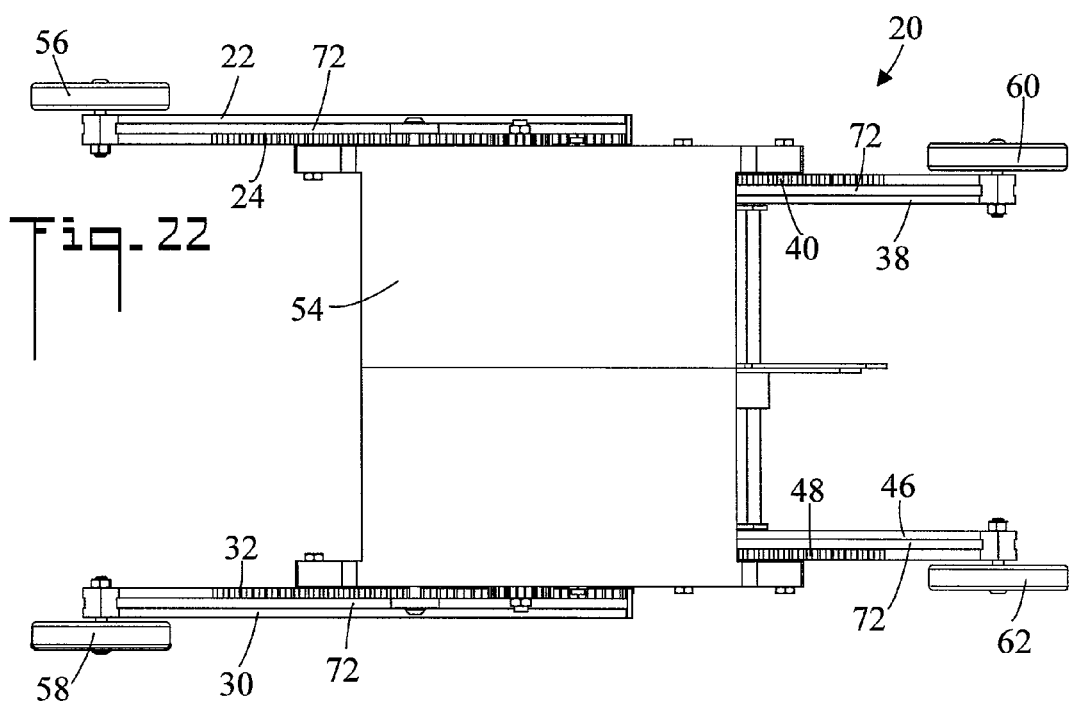

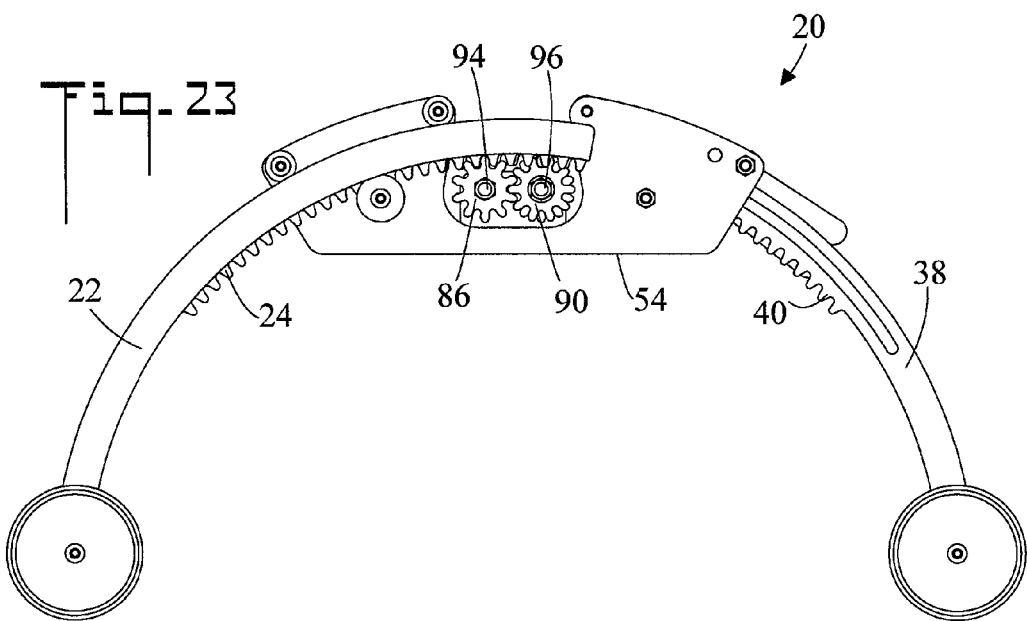
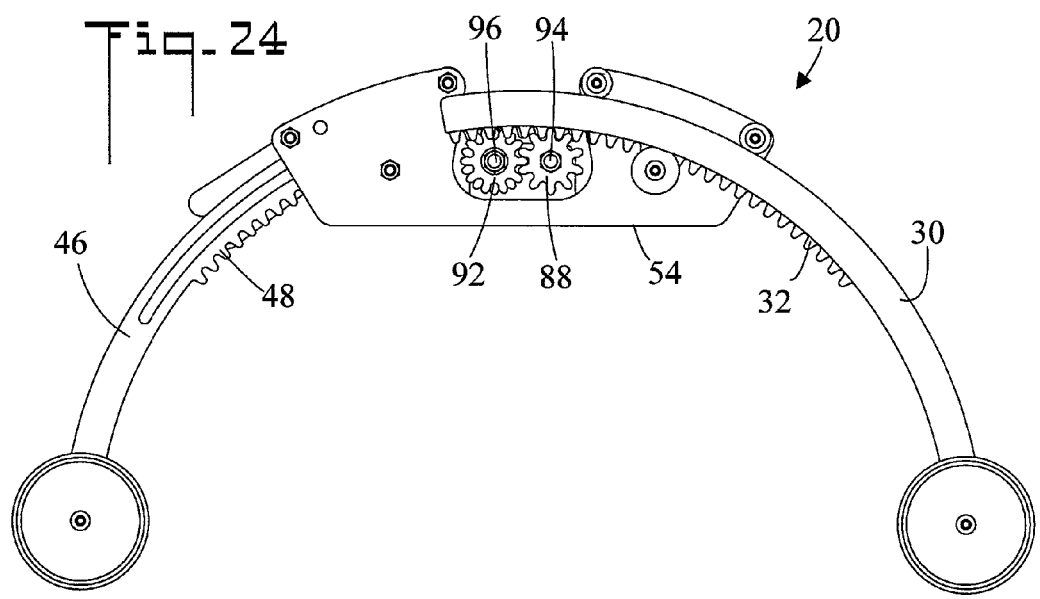

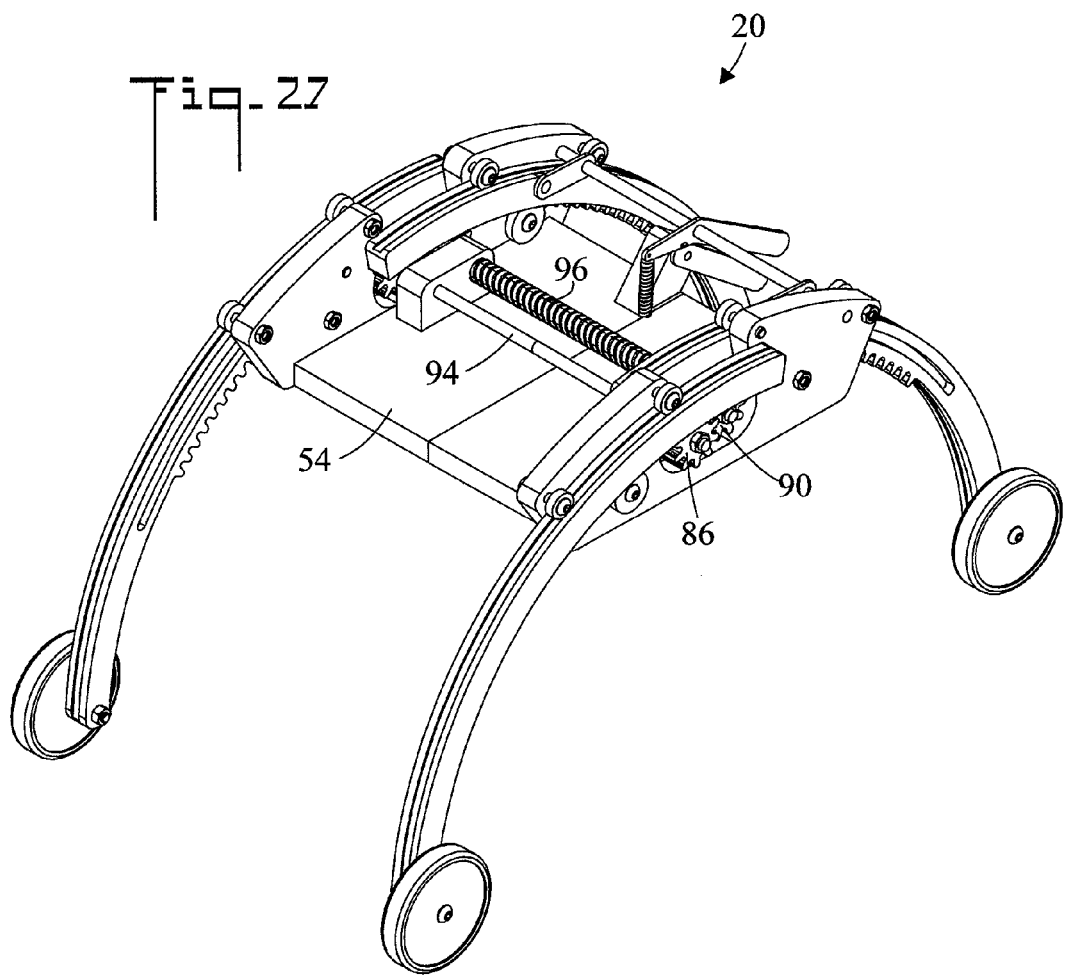

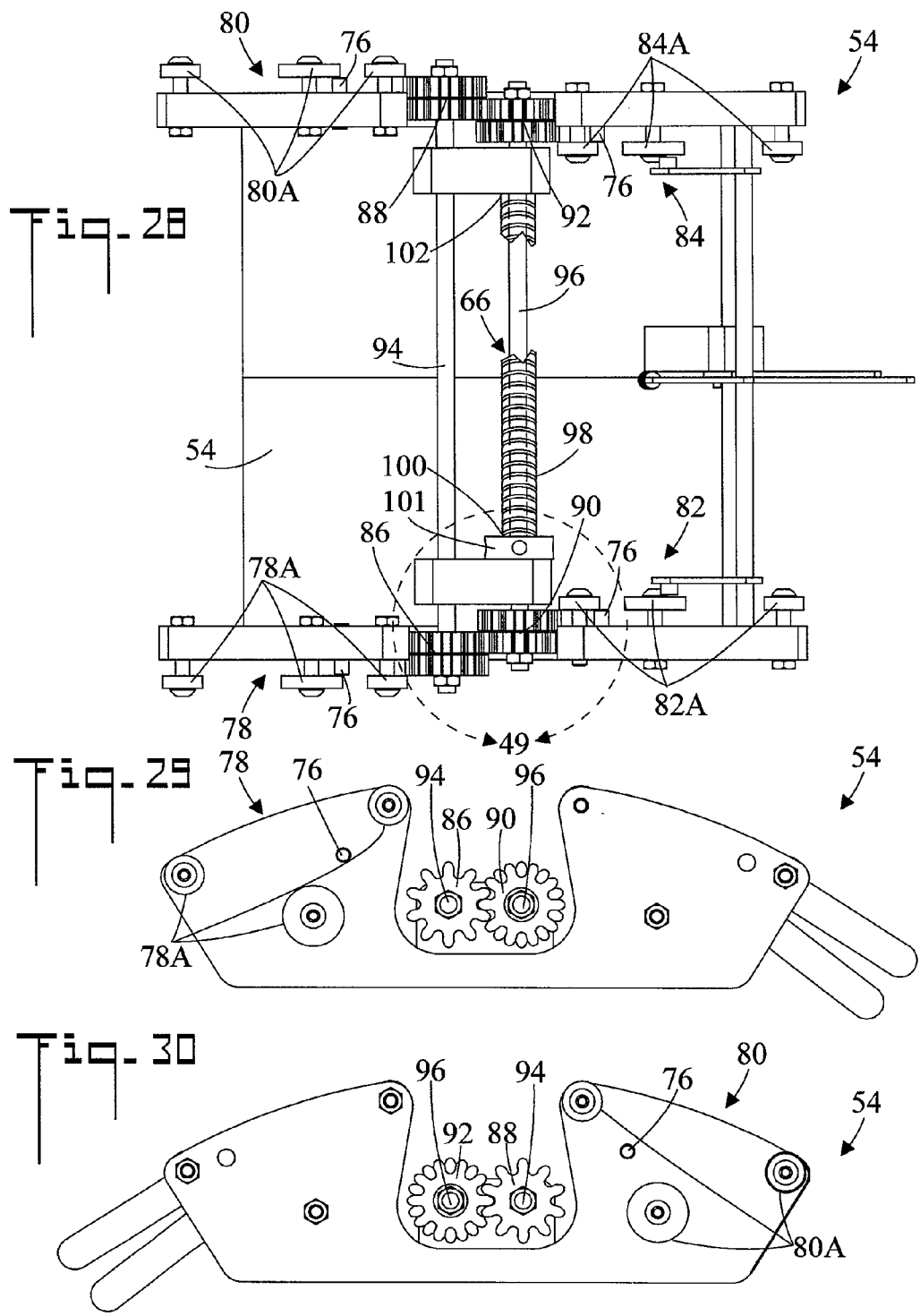

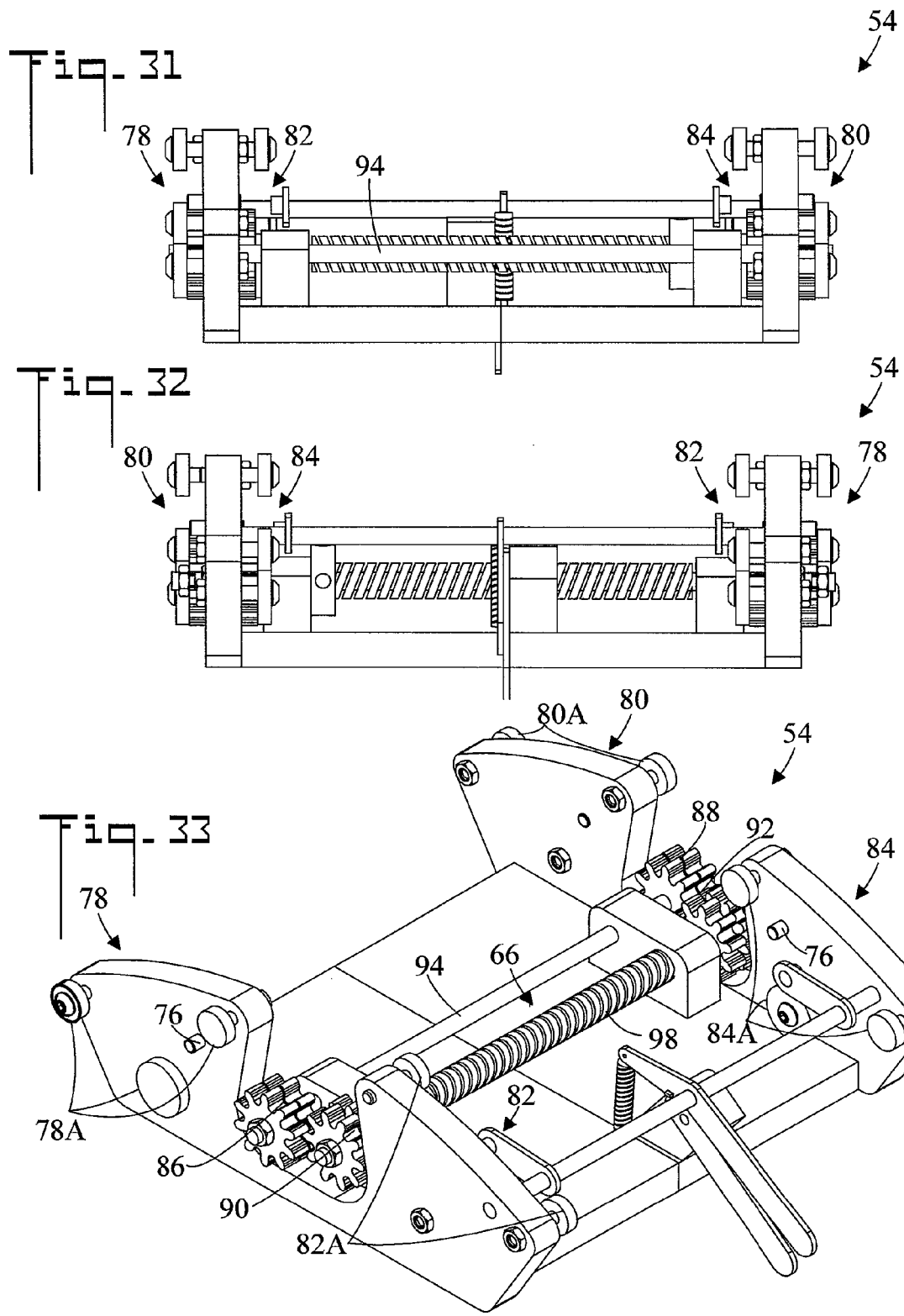

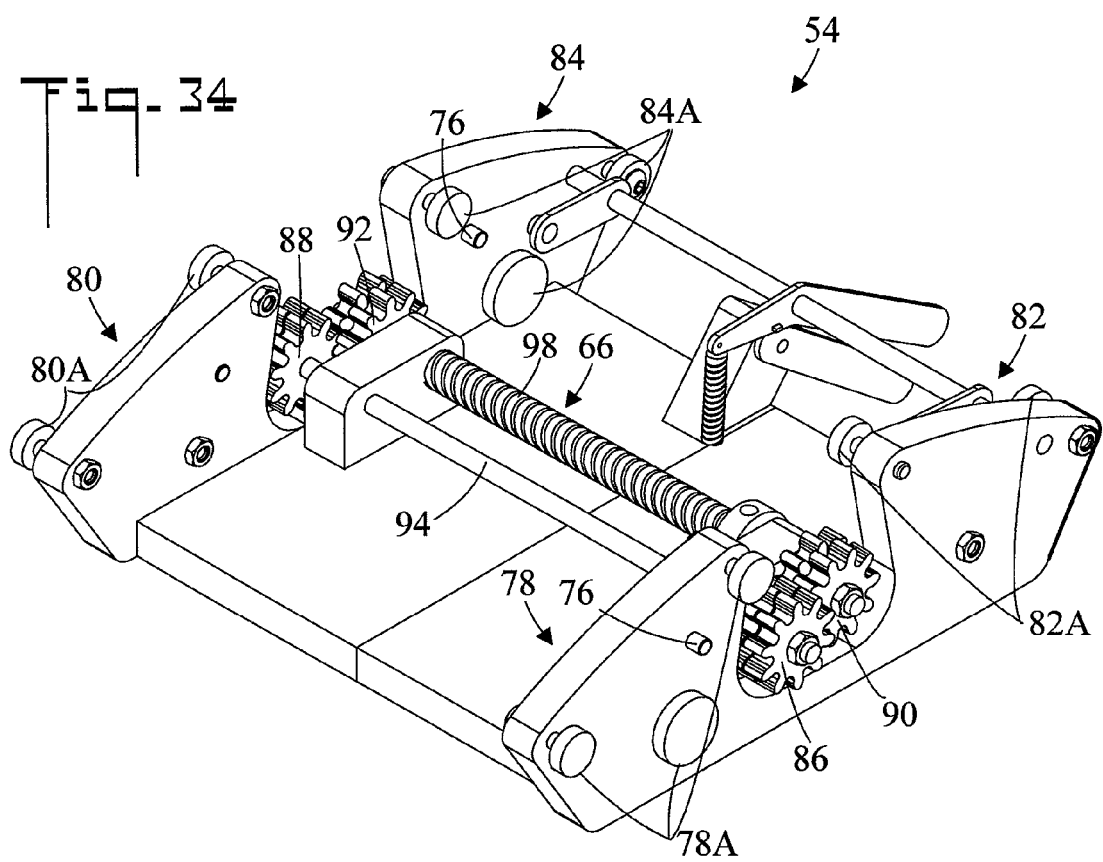

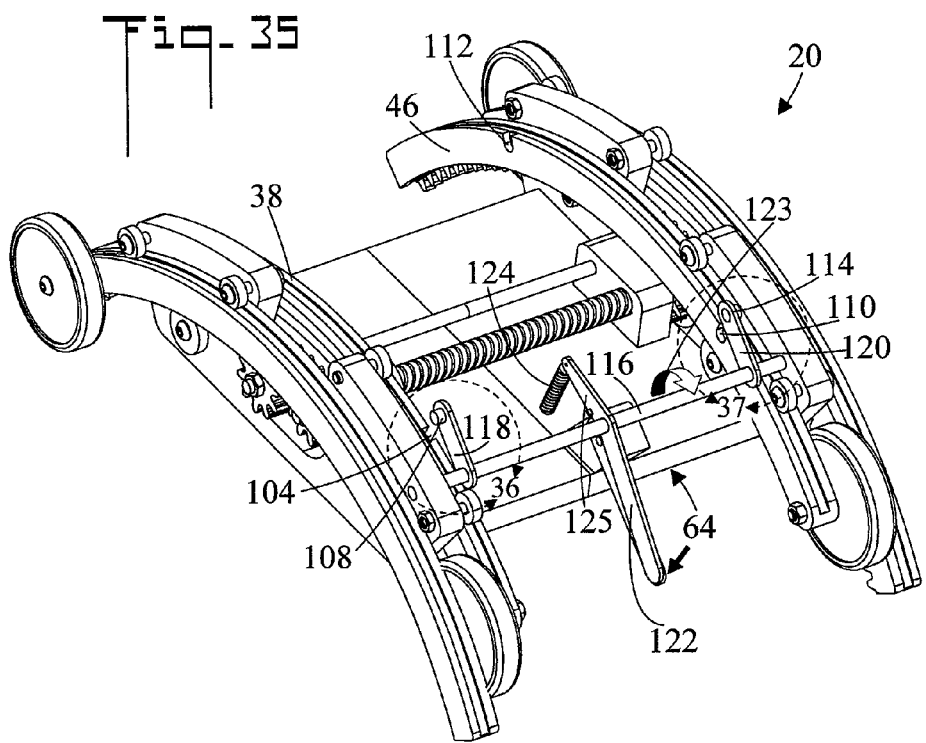
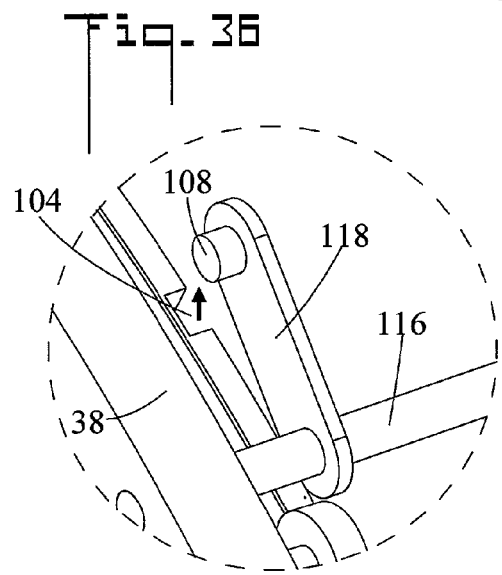
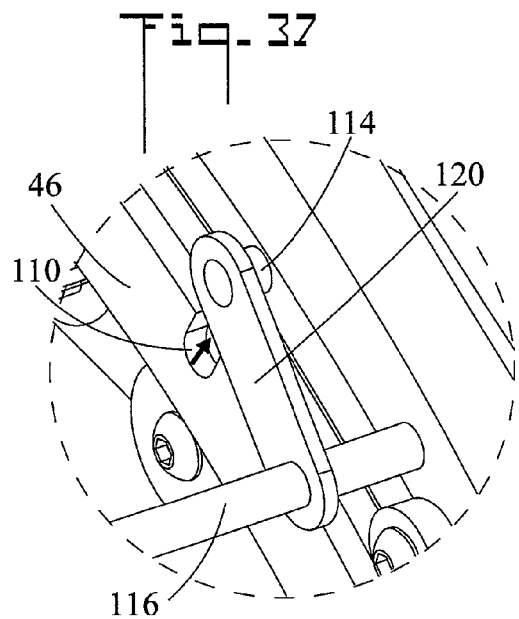

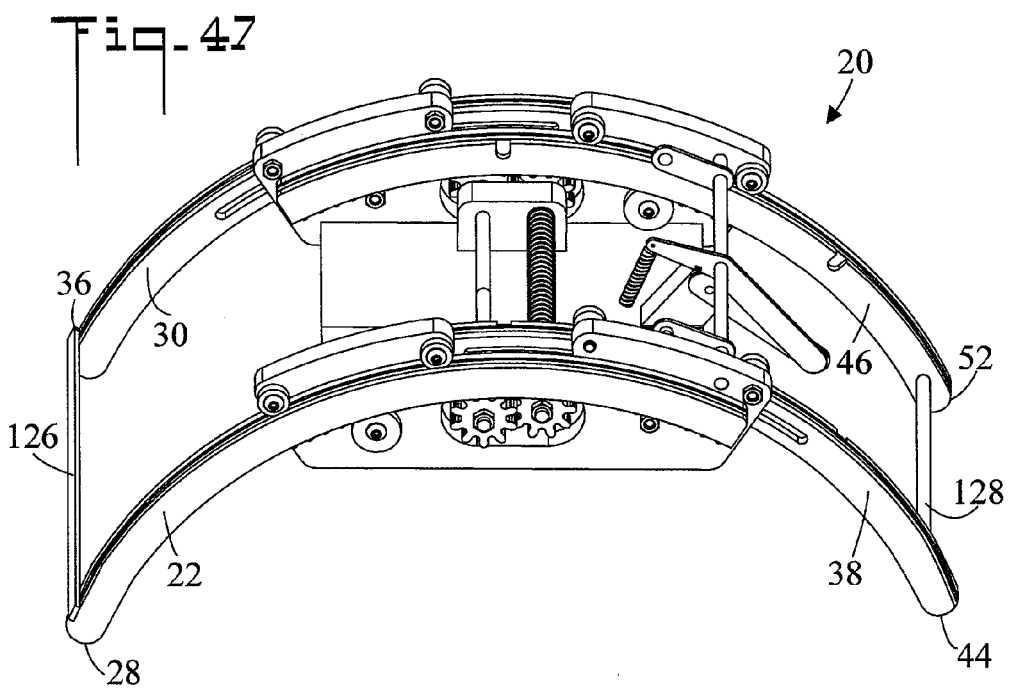
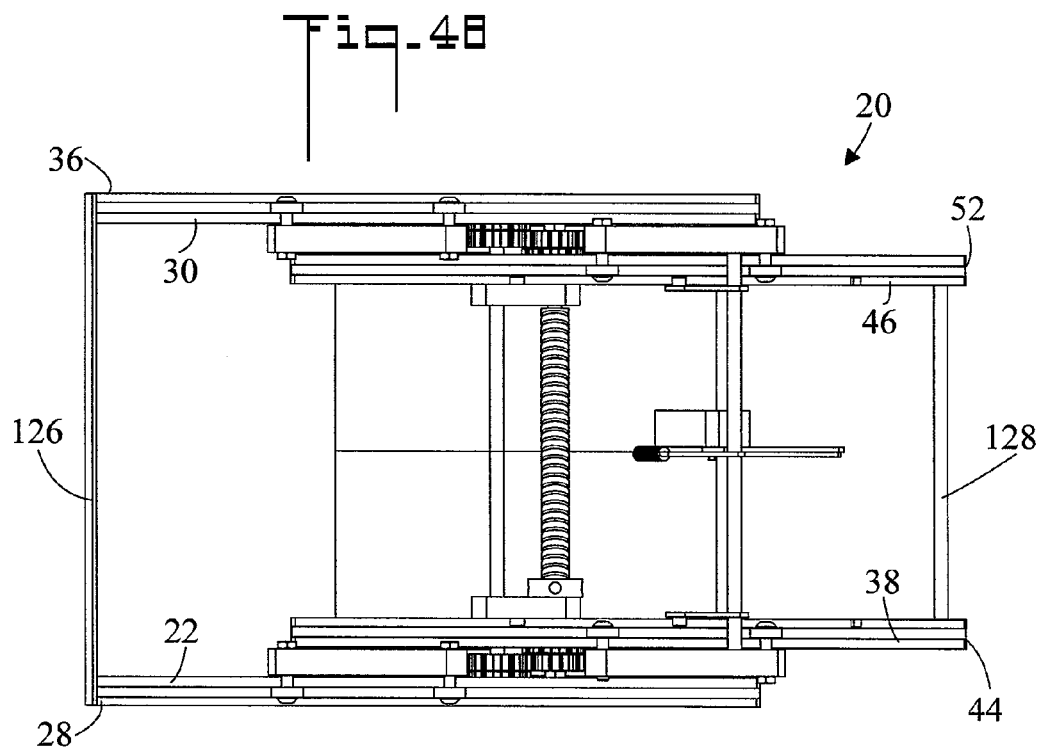

DEVICE HAVING LEGS WHICH EXTEND AND RETRACT AND METHOD OF USE

CROSS REFERENCE TO RELATED APPLICATION

None

TECHNICAL FIELD

The present invention pertains generally to devices which have legs, and more particularly to a device which as legs which both extend and retract.

BACKGROUND OF THE INVENTION

Many devices have legs. Examples are tables, chairs, platforms, wheeled vehicles, etc. In these devices the legs are usually fixed and do not extend or retract. in some applications it would be advantageous for the legs of the device to selectively extend and retract.

BRIEF SUMMARY OF THE INVENTION

The present invention is directed to a device which has movable legs which selectively extend or retract. The legs can be placed in either an extended position projecting away from the body of the device, or to a retracted position adjacent to the body. For example, the legs of the device can be extended during use, or collapsed during transportation or storage. The legs can be locked in either the extended position or the retracted position. In an embodiment, a biasing device urges the legs to the extended position.

In accordance with an embodiment, a device has legs which extend and retract. The device includes (1) a first curved leg having a first plurality of teeth, a proximal end, and an opposite distal end, (2) a second curved leg having a second plurality of teeth, a proximal end, and an opposite distal end, the second curved leg residing in spaced apart relationship with the first curved leg, (3) a third curved leg having a third plurality of teeth, a proximal end, and an opposite distal end, (4) a fourth curved leg having a fourth plurality of teeth, a proximal end, and an opposite distal end, the fourth curved leg residing in spaced apart relationship with the third curved leg, and (5) a body connected to the first, the second, the third, and the fourth curved legs. The first, the second, the third, and the fourth curved legs are positionable to an extended position away from the body and to a retracted position adjacent to the body.

In accordance with another embodiment, a first wheel is disposed at the distal end of the first curved leg, a second wheel is disposed at the distal end of the second curved leg, a third wheel is disposed at the distal end of the third curved leg, and a fourth wheel is disposed at the distal end of the fourth curved leg.

In accordance with another embodiment, the body includes a first gear which meshes with the first plurality of teeth of the first curved leg. The body also includes a second gear which meshes with the second plurality of teeth of the second curved leg. The body also includes a third gear which meshes with the third plurality of teeth of the third curved leg and also meshes with the first gear. The body also includes a fourth gear which meshes with the fourth plurality of teeth of the fourth curved leg and also meshes with the second gear.

In accordance with another embodiment, the first gear is connected to a first shaft, and the second gear is also connected to the first shaft in spaced apart relationship with the first gear. The third gear is connected to a second shaft, and the fourth gear connected to the second shaft in spaced apart relationship with the third gear.

In accordance with another embodiment, a biasing mechanism urges the first curved leg, the second curved leg, the third curved leg, and the fourth curved leg to the extended position.

In accordance with another embodiment, the biasing mechanism includes a torsion spring which surrounds either of the first shaft and the second shaft. The torsion spring has one end which is connected to either of the first shaft and the second shaft, and an opposite end which is connected to the body.

In accordance with another embodiment, the first, the second, the third, and the fourth curved legs are each arcs.

In accordance with another embodiment, the first and second curved legs are spaced further apart than the third and fourth curved legs.

In accordance with another embodiment, a first rod connects the distal ends of the first and second curved legs, and a second rod connects the distal ends of the third and fourth curved legs.

In accordance with another embodiment, the body includes a first guide through which the first curved leg moves, a second guide through which the second curved leg moves, a third guide through which the third curved leg moves, and a fourth guide through which the fourth curved leg moves.

In accordance with another embodiment, the first guide includes three first rollers, the second guide including three second rollers, the third guide includes three third rollers, and the fourth guide includes three fourth rollers.

In accordance with another embodiment, a locking mechanism holds the first curved leg, the second curved leg, the third curved leg, and the fourth curved leg in both the retracted position and the extended position.

In accordance with another embodiment, the locking mechanism includes the third curved leg having a first notch spaced apart from a second notch. A first stop is engages one of the first and the second notches. When the third curved leg is in the retracted position, the first stop engages the first notch. When the third curved leg is in the extended position, the first stop engages the second notch. The fourth curved leg has a third notch spaced apart from a fourth notch. A second stop engages one of the third and the fourth notches. When the fourth curved leg is in the retracted position, the second stop engages the third notch. When the fourth curved leg is in the extended position, the second stop engages the fourth notch.

In accordance with another embodiment, a release is provided for moving the first stop out of the first and the second notches, and for moving the second stop out of the third and fourth notches.

In accordance with another embodiment, the release includes a release shaft. The first stop is connected to the release shaft by a first arm, and the second stop is connected to the release shaft by a second arm. A handle is connected to the release shaft, so that the release shaft can be rotated to disengage the first stop from the first notch and from the second notch, and to disengage the second stop from the third notch and the second notch.

In accordance with another embodiment, each of the third and fourth curved legs has a slot. The body has two posts, wherein one post is received by and travels in each of the slots.

Other embodiments, in addition to the embodiments enumerated above, will become apparent from the following detailed description, taken in conjunction with the accompanying drawings, which illustrate, by way of example, the principles of the device and method of use.

BRIEF DESCRIPTION OF THE DRAWINGS

FIG. 1 is a perspective view of a device which has legs which both extend and retract, showing the legs in a retracted position;

FIG. 2 is a perspective view of the device with the legs in an extended position;

FIG. 3 is a side elevation view of the device with the legs in the retracted position;

FIG. 4 is a side elevation view of the device with the legs in a partially extended position;

FIG. 5 is a side elevation view of the device with the legs in the extended position;

FIG. 6 is a side elevation view of the device with the legs in a partially retracted position;

FIG. 7 is a reverse side elevation view of the device with the legs in the extended position;

FIG. 8 is an enlarged cross sectional view along the line 8-8 of FIG. 5;

FIG. 9 is an enlarged cross sectional view along the line 9-9 of FIG. 7;

FIG. 10 is an enlarged cross sectional view along the line 10-10 of FIG. 5;

FIG. 11 is an enlarged cross sectional view along the line 11-11 of FIG. 7;

FIG. 17 is an end elevation view of the device in the retracted position;

FIG. 18 is an opposite end elevation view of the device in the retracted position;

FIG. 19 is a bottom plan view of the device in the retracted position;

FIG. 20 is a perspective view of the device in the retracted position;

FIG. 21 is a top plan view of the device in the extended position;

FIG. 22 is a bottom plan view of the device in the extended position;

FIG. 23 is a side elevation view of the device in the extended position;

FIG. 24 is an opposite side elevation view of the device in the extended position;

FIG. 27 is a perspective view of the device in the extended position;

FIG. 28 is an enlarged top plan view of a body;

FIG. 29 is an enlarged side elevation view of the body;

FIG. 30 is an enlarged opposite side elevation view of the body;

FIG. 31 is an enlarged end elevation view of the body;

FIG. 32 is an enlarged opposite end elevation view of the body;

FIG. 33 is an enlarged perspective view of the body;

FIG. 34 is another enlarged perspective view of the body;

FIG. 35 is a perspective view of the device in the retracted position with a locking mechanism in a disengaged position;

FIG. 36 is an enlarged view of area 36 of FIG. 35;

FIG. 37 is an enlarged view of area 37 of FIG. 35;

FIG. 47 is a perspective view of another embodiment of the device in the partially extended position;

FIG. 48 is a top plan view of the other embodiment device in the partially extended position;

DETAILED DESCRIPTION OF THE INVENTION

Figure 12:
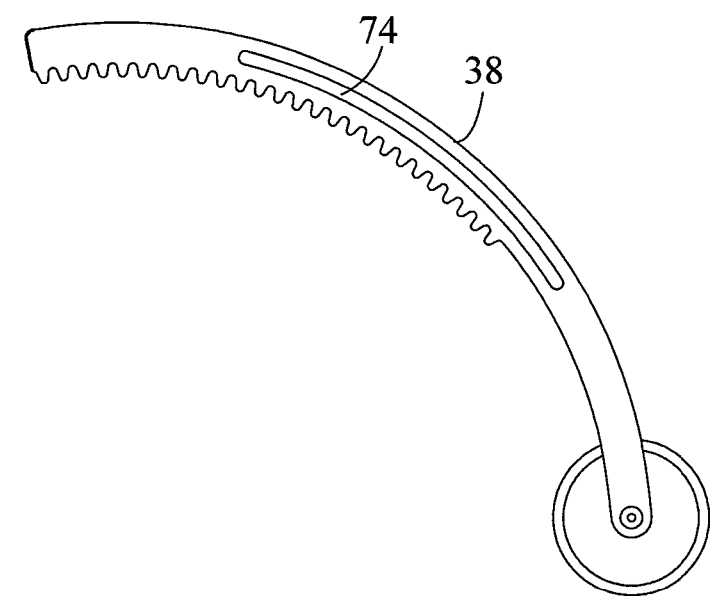
FIG. 12 is a side elevation view of a leg.

Referring initially to FIGS. 1 and 2, there are illustrated perspective views of a device 20 which has legs which both extedn and retract, showing the legs in retracted and extended positions respectively. Also referring to FIGS. 3-7 and FIGS. 21-22, device 20 includes a first curved leg 22 which has a first plurality of teeth 24, a proximal end 26, and an opposite distal end 28. Device 20 also includes a second curved leg 30 which has a second plurality of teeth 32, a proximal end 34, and an opposite distal end 36. Second curved leg 30 resides in spaced apart relationship with first curved leg 22. In the shown embodiment, legs 22 and 30 are parallel. Device 20 also includes a third curved leg 38 which has a third plurality of teeth 40, a proximal end 42, and an opposite distal end 44. Device 20 also includes a fourth curved leg 46 which has a fourth plurality of teeth 48, a proximal end 50, and an opposite distal end 52. Fourth curved leg 46 resides in spaced apart relationship with third curved leg 38. In the shown embodiment, legs 38 and 46 are parallel.

A body 54 is connected to first 22, second 30, third 38, and fourth 46 curved legs (also refer to FIGS. 28-34). First 22, second 30, third 38, and fourth 46 curved legs are positionable to a retracted position adjacent to body 54 as is shown in FIG. 1 and to an extended position away from body 54 as is shown in FIG. 2. In other words, curved legs 22, 30, 38, and 46 can be selectively moved by a user to the inwardly collapsed position of FIG. 1, or to the fully outwardly extended position of FIG. 2.

In the shown embodiment, a first wheel 56 is disposed at distal end 28 of first curved leg 22, a second wheel 58 is disposed at distal end 36 of second curved leg 30, a third wheel 60 is disposed at distal end 44 of third curved leg 38, and a fourth wheel 62 is disposed at distal end 52 of fourth curved leg 46. When so configured, device 20 can be used to conveniently move a load upon a support surface 500. It is further noted that wheels 56, 58, 60, and 62 can be either conventional fixed axle wheels, or castor wheels. However, it is also noted that in another embodiment device 20 can be used without wheels as is shown in FIGS. 47 and 48.

Device 20 further includes a locking mechanism 64 which holds first curved leg 22, second curved leg 30, third curved leg 38, and fourth curved leg 46 in both the retracted position of FIG. 1 and the extended position of FIG. 2 (refer also to FIGS. 35-46 and the associated discussions).

FIG. 3 through 5 show the transitional sequence of the legs (22, 30, 38, and 46) of device 20 from the retracted position to the extended position. In FIG. 3 the legs are in the retracted position adjacent to body 54. In FIG. 4 the legs have moved to a partially extended position as indicated by the arrows. In FIG. 5, the legs are have moved to the extended position. FIG. 6 is a side elevation view of device 20 with the legs in a partially retracted position. This would occur if the legs were moved from the extended position of FIG. 5 to the retracted position of FIG. 3. FIG. 7 is a reverse side elevation view of device 20 with the legs in the extended position.

Device 20 further includes a biasing mechanism 66 which urges first curved leg 22, second curved leg 30, third curved leg 38, and fourth curved leg 46 to the extended position of FIG. 2 (refer also to FIGS. 33 and 34 and the associated discussions). As is shown in FIG. 4, when device 20 is in the retracted position and locking mechanism 64 is disengaged (refer to FIGS. 35-46 and the associated discussions), biasing mechanism 66 urges the four legs to the extended position. If device 20 resides upon a support surface 500 as shown, the urging of the legs causes body 54 to be pushed upward. This is a convenient feature in that device 20 automatically expands to the extended position, rather than having to be manually extended by a user.

Biasing mechanism 66 also functions when device 20 is being placed in the retracted position, but in an opposite manner. As is shown in FIG. 6, when device 20 is in the extended position and locking mechanism 64 is disengaged (refer to FIGS. 35-46 and the associated discussions), biasing mechanism 66 still urges the four legs to the extended position. However, in this instance the biasing impedes the retraction of the legs toward body 54. This is also a useful feature in that the transition from the extended position to the retracted position is slowed, thereby preventing the legs from collapsing too fast. In one embodiment the user must push down on body 54 to overcome the biasing effect and place the legs in the retracted position. In the shown embodiment, biasing mechanism 66 biases a gear which in turn biases the four legs, as is discussed below (refer to FIGS. 35-46 and the associated discussions). In FIGS. 4 and 6, arrow 68 shows the direction of bias of the gear.

FIG. 8 is an enlarged cross sectional view of first leg 22 along the line 8-8 of FIG. 5, FIG. 9 is an enlarged cross sectional view of second leg 30 along the line 9-9 of FIG. 7, FIG. 10 is an enlarged cross sectional view of third leg 38 along the line 10-10 of FIG. 5, and FIG. 11 is an enlarged cross sectional view of fourth leg 46 along the line 11-11 of FIG. 7. It is noted that the four legs are similar in construction, but are each unique due to the placement of the teeth and their left and right position. It is noted that first leg 22 and second leg 30 are mirror images, and that third leg 38 and fourth leg 46 are mirror images. All four legs have top 70 and bottom 72 grooves which receive the rollers of guides (refer to FIGS. 15-16, 21-22, and 28-34 and the associated discussions).

Figure 13:
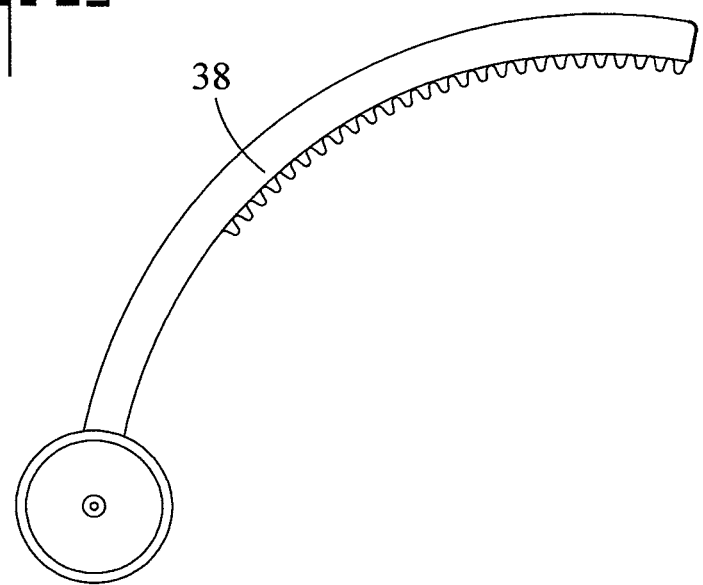
FIG. 13 is an opposite side elevation view of the leg.
Figure 14:
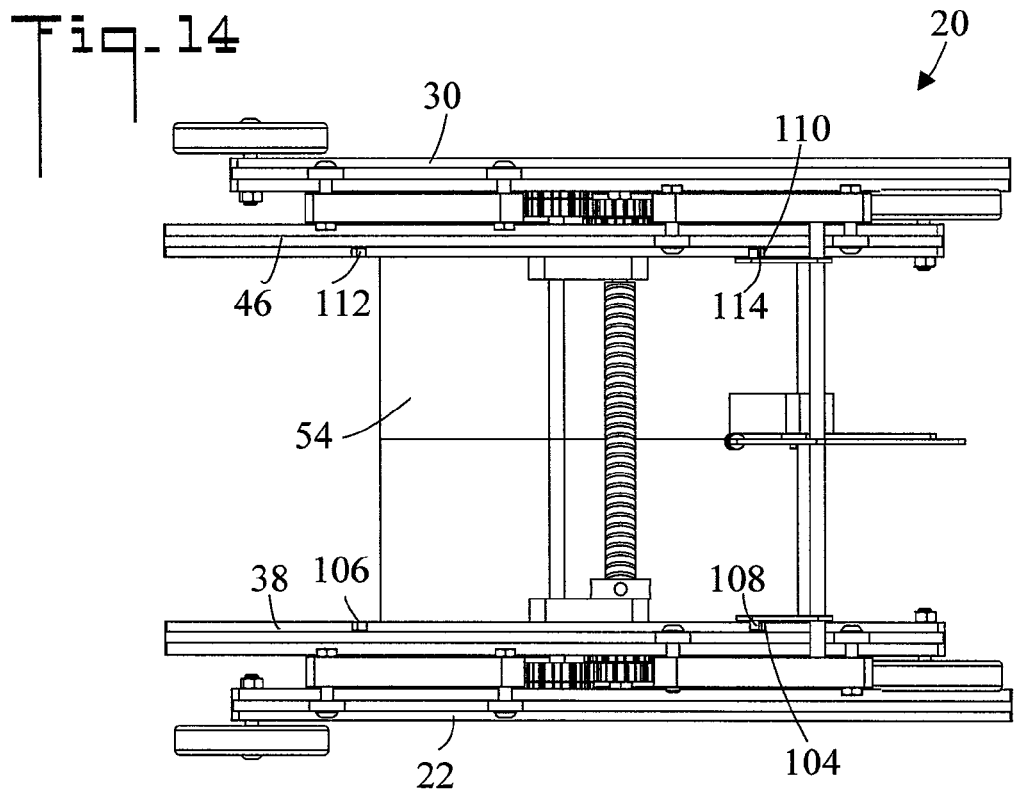
FIG. 14 is a top plan view of the device in the retracted position.
Figure 15:
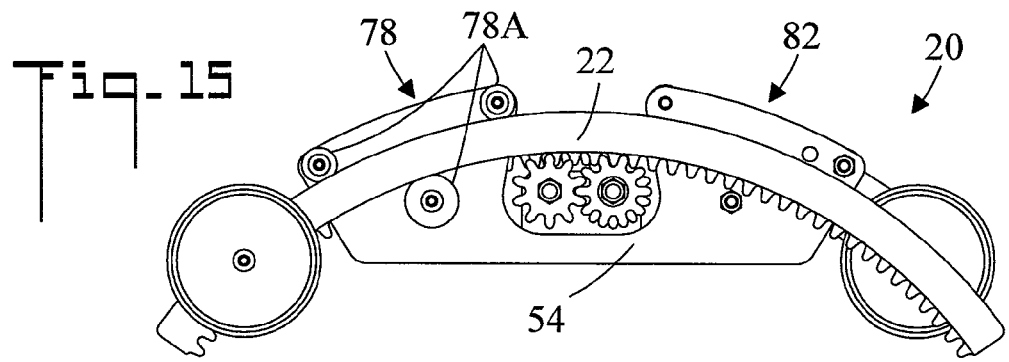
FIG. 15 is a side elevation view of the device in the retracted position.
Figure 16:
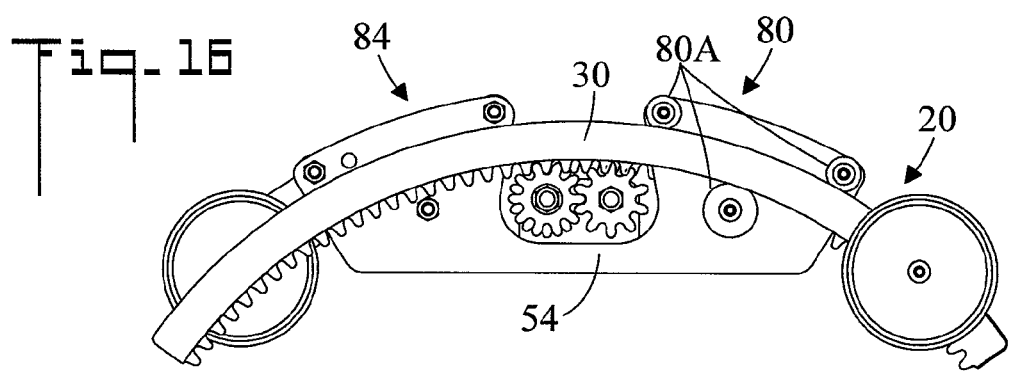
FIG. 16 is an opposite side elevation view of the device in the retracted position.
Figure 25:
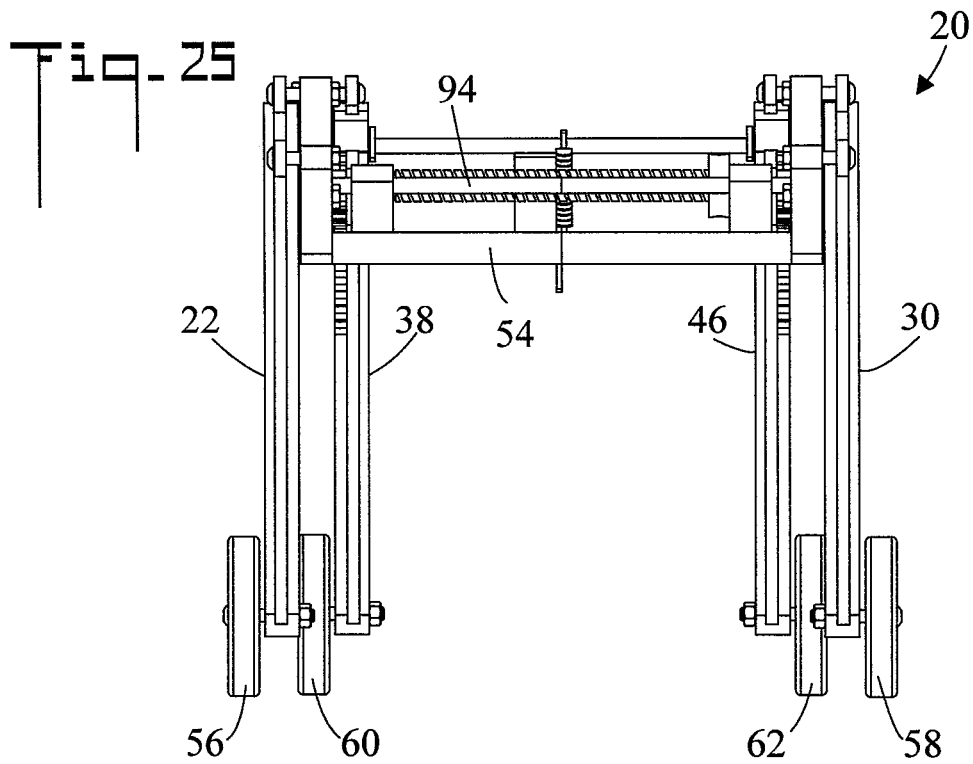
FIG. 25 is an end elevation view of the device in the extended position.
Figure 26:
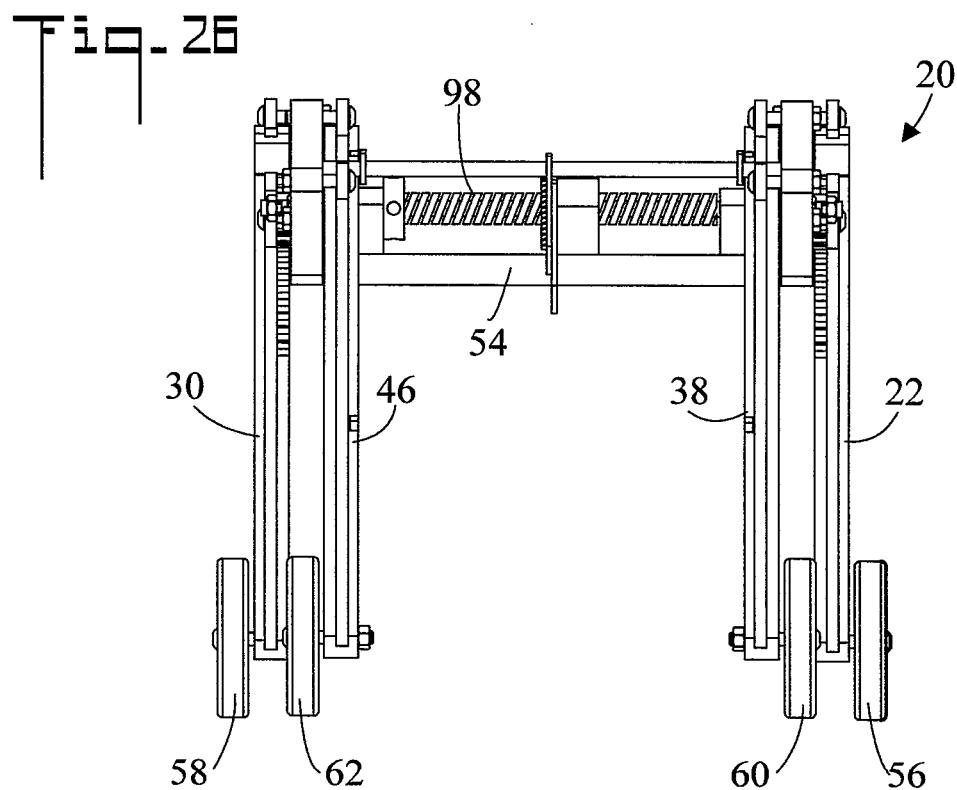
FIG. 26 is an opposite end elevation view of the device in the extended position.

FIG. 12 is a side elevation view of a leg (third leg 38) and FIG. 13 is an opposite side elevation view of third leg 38. It is noted that in an embodiment all curved legs (22, 30, 38, and 46) are each arcs (a segment of a circle), and that the teeth are disposed on the bottom of the legs. In an embodiment, third curved leg 38 and fourth curved leg 46 each have a slot 74 disposed on the inside of the legs (refer also to FIGS. 5 and 7). Body 54 has two posts 76, wherein one post 76 is received by and travels in each slot 74 (refer to FIGS. 28, 33, and 34). Slots 74 and cooperating posts 76 serve to limit the travel of the legs so they will stay connected to body 54, and also serve as an alignment for a locking mechanism 64 (refer to FIGS. 1-2, and 35-46 and the associated discussions). In the shown embodiment, first 22 and second 30 curved legs also have slots 74 which cooperate with posts 76 on body 54.

FIG. 14-20 are top plan, side elevation, opposite side elevation, end elevation, opposite end elevation, bottom plan, and perspective views respectively of device 20 in the retracted position. Shown are first curved leg 22, second curved leg 30, third curved leg 38, fourth curved leg 46, and body 54. Also referring to FIGS. 28-34, body 54 includes a first guide 78 through which first curved leg 22 moves, a second guide 80 through which second curved leg 30 moves, a third guide 82 through which third curved leg 38 moves, and a fourth guide 84 through which fourth curved leg 46 moves. In an embodiment, first guide 78 include three first rollers 78A, second guide 80 includes three second rollers 80A, third guide 82 includes three third rollers 82A, and fourth guide 84 includes three fourth rollers 84A. The top two rollers fit into the top grooves 70 of each leg, and the bottom roller fits into the bottom groove 72 on each leg (refer also to FIGS. 8-11).

FIG. 21-27 are top plan, bottom plan, side elevation, opposite side elevation, end elevation, opposite end elevation, and perspective views respectively of device 20 in the extended position. Shown are first curved leg 22 (having teeth 24, proximal end 26, and distal end 28), second curved leg 30 (having teeth 32, proximal end 34, and distal end 36), third curved leg 38 (having teeth 40, proximal end 42, and distal end 4), fourth curved leg 46 (having teeth 48, proximal end 50, and distal end 52), body 54, first wheel 56, second wheel 58, third wheel 60, fourth wheel 62, top grooves 70, and bottom grooves 72. Also referring to FIGS. 28-34, body 54 includes a first gear 86 which meshes with first plurality of teeth 22 of first curved leg 22. Body 54 also includes a second gear 88 which meshes with second plurality of teeth 32 of second curved leg 30. Body also includes a third gear 90 which meshes with third plurality of teeth 40 of third curved leg 38 and also meshes with first gear 86. Body also includes a fourth gear 92 which meshes with fourth plurality of teeth 48 of fourth curved leg 46 and also meshes with second gear. In the shown embodiment gears 86, 88, 90, and 92 are spur gears which mesh with teeth 24, 32, 40, and 48 respectively. This design comprises a rack (teeth) and pinion (gears) arrangement where the rack is curved rather than being straight.

First gear 86 is fixedly connected to a first shaft 94. Second gear 88 is also fixedly connected to first shaft 94 in spaced apart relationship with first gear 86. Third gear 90 is fixedly connected to a second shaft 96. Fourth gear 92 is also fixedly connected to second shaft 96 in spaced apart relationship with third gear 90. It is noted that in the shown embodiment second shaft 96 is surrounded by a torsion spring 98 which is part of biasing mechanism 66 which is discussed below. As such, second shaft 96, which in the shown embodiment is the same size as first shaft 94, is hidden from view. FIG. 28 provides a cutaway view showing second shaft 96. It is further noted that in the shown embodiment gears 86, 88, 90, and 92 each actually include two split gears which are fixedly connected to shafts 94 and 96 is side by side relationship (refer also to FIGS. 49 and 50 and the associated discussions).

Also referring to FIG. 28, biasing mechanism 66 urges the four legs to the extended position. In the shown embodiment, biasing mechanism 66 includes torsion spring 98 which surrounds one of first shaft 94 and second shaft 96 (second shaft 96 in the shown embodiment). Torsion spring 98 has one end 100 which is fixedly connected to either of first shaft 94 and second shaft 96 such as by a collar 101, and an opposite end 102 which is fixedly connected to body 54. As such, the turning of first shaft 94 or second shaft 96 will wind and unwind torsion spring 98. Unwinding causes the legs to move to the extended position. In an embodiment, torsion spring 98 is adjusted so that when the legs are in the extended position, torsion spring is somewhat wound thereby urging the legs to the extended position. As the legs are moved to the retracted position, torsion spring 98 becomes more tightly wound thereby resisting the transition from the extended position the retracted position. It may be appreciated the torsion spring 98 could be placed on first shaft 94 rather than second shaft 96, or that torsion springs 98 could be placed on both shafts.

First gear 86, second gear 88, third gear 90, and fourth gear 92 cooperate with teeth 24, 32, 40, and 48 respectively to form an integrated gearing assembly with controls the retraction and expansion of legs 22, 30, 38, and 46 respectively (refer also to FIGS. 23 and 24). In FIG. 23, as first gear 86 turns counterclockwise meshed teeth 24 of first leg 22 cause first leg 22 to move generally to the left thereby extending leg 22. When first gear 86 turns counterclockwise, meshing third gear 90 turns clockwise causing meshed teeth 40 of third leg 38 to move generally to the right thereby extending third leg 38. Similarly, second gear 88 which is connected to first gear 86 by shaft 94 causes second leg 30 to extend, and fourth gear 92 which is connected to third gear 90 by shaft 96 causes fourth leg 46 to extend. It may be appreciated that turning the gears in the opposite direction will result in the legs retracting. In the shown embodiment biasing mechanism 66 acts upon second shaft 96 which in turn biases third gear 90 and fourth gear 92 to cause all the legs to extend.

In FIG. 21, it is noted that outer first 22 and second 30 curved legs are spaced further apart than inner third 38 and fourth 46 curved legs. That is, first 22 and second 30 curved legs are spaced apart a distance D, and third 38 and fourth 46 curved legs are space apart a distance D1 which is less than distance D.

FIG. 28-34 are enlarged top plan, enlarged side elevation, enlarged opposite side elevation, enlarged end, enlarged opposite end, enlarged perspective, and enlarged other perspective views respectively of the body 54. Shown are, biasing mechanism 66, posts 76, first guide 78, first rollers 78A, second guide 80, second rollers 80A, third guide 82, third rollers 82A, fourth guide 84, second rollers 84A, first gear 86, second gear 88, third gear 90, fourth gear 92, first shaft 94, second shaft 96, torsion spring 98 having ends 100 and 102, and collar 101.

Figure 38:
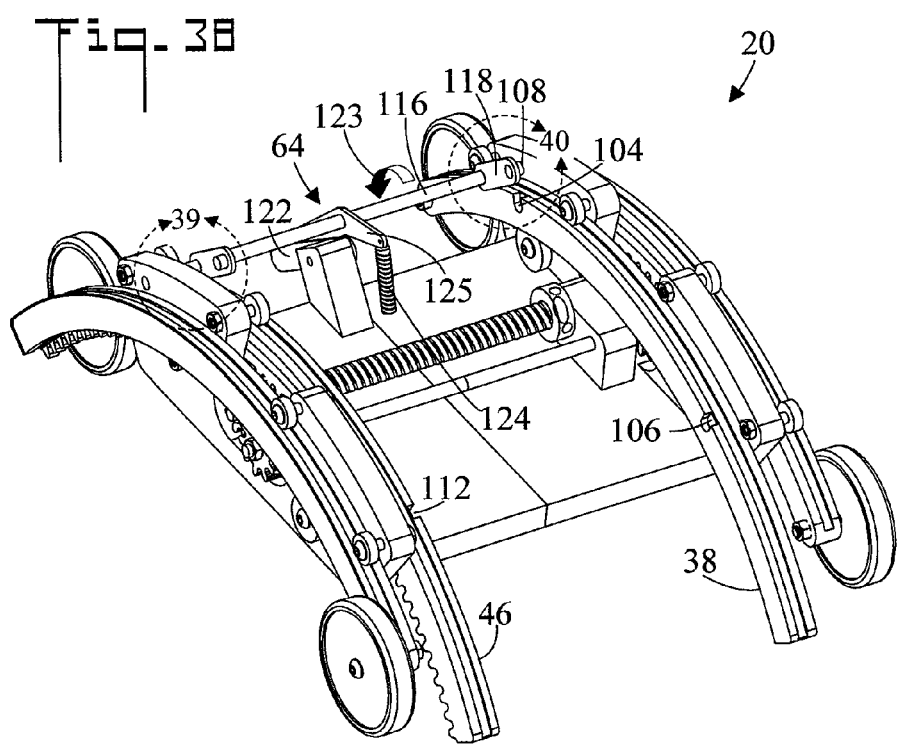
FIG. 38 is an opposite perspective view of the device in the retracted position with a locking mechanism in the disengaged position.
Figure 39:
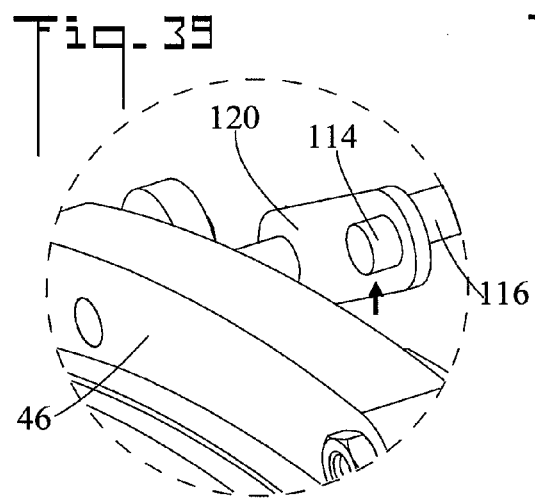
FIG. 39 is an enlarged view of area 36 of FIG. 38.
Figure 40:
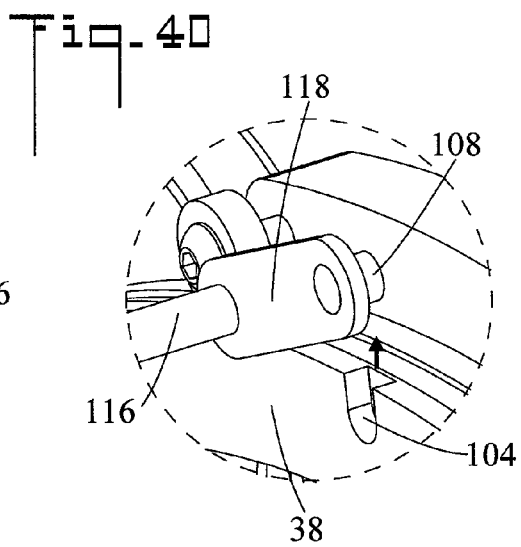
FIG. 40 is an enlarged view of area 37 of FIG. 38.

FIG. 35 is a perspective view of device 20 in the retracted position with locking mechanism 64 in a disengaged position, FIG. 36 is an enlarged view of area 36 of FIG. 35, and FIG. 37 is an enlarged view of area 37 of FIG. 35. FIG. 38 is an opposite perspective view of device 20 in the retracted position with locking mechanism 64 in the disengaged position. FIG. 39 is an enlarged view of area 36 of FIG. 38, and FIG. 40 is an enlarged view of area 37 of FIG. 38. In the shown embodiment, locking mechanism 64 includes third curved leg 38 having a first notch 104 spaced apart from a second notch 106. A first stop 108 (pin) engages one of the first 104 and second 106 notches. That is, first stop 108 downwardly enters one of first 104 and second 106 notches and thereby lock curved leg 38 in place in either the retracted position of the extended position respectively. When third curved leg 38 is in the retracted position, first stop 108 engages first notch 104 (refer also to FIG. 14). Conversely when third curved leg 38 is in the extended position, first stop 108 engages second notch 106 (refer also to FIG. 21). It is noted that in FIGS. 35, 36, 38, and 40, first stop 108 has been disengaged from first notch 104, thereby permitting leg 38 (as well as the other three legs) to move from the retracted position to the extended position.

Locking mechanism 64 further includes fourth curved leg 46 having a third notch 110 spaced apart from a fourth notch 112. A second stop 114 engages one of third 110 and fourth 112 notches. When fourth curved leg 46 is in the retracted position, second stop 114 engages third notch 110 (refer also to FIG. 14). Conversely, when fourth curved leg 46 is in the extended position, second stop 114 engages fourth notch 112 (refer also to FIG. 21). It is noted that in FIGS. 35, 37, 38, and 39, second stop 114 has been disengaged from third notch 110, thereby permitting leg 46 (as well as the other three legs) to move from the retracted position to the extended position.

A release is provided for moving first stop 108 out of first 104 and second 106 notches, and for moving second stop 114 out of third 110 and fourth 112 notches. That is, the release disengages the stops from the notches thereby allowing the legs to move. Whereas if the stops engage the notches, the legs are locked in either the retracted position or the retracted position. In the shown embodiment the release includes a release shaft 116. First stop 108 is connected to release shaft 116 by a first arm 118, and second stop 114 connected to release shaft 116 by a second arm 120. A handle 122 is connected to release shaft 116, so that release shaft 116 can be rotated in the direction of arrow 123 to disengage first stop 108 from first notch 104 and from second notch 106, and to disengage second stop 114 from third notch 110 and second notch 112 (as is shown in FIGS. 35 and 38). It is noted that a spring 124 bias release shaft 116 in the opposite direction from release (direction 123) thereby causing the stops to remain engaged with the notches. Spring 124 is connected between a plate of body 54 and release shaft 116 by an arm 126 which is attached to release shaft 116. The user overcomes the bias when using handle 122 to disengage the stops from the notches. The release is activated by a user when it is desired to move the legs from the retracted position to the extended position, or visa versa.

Figure 41:
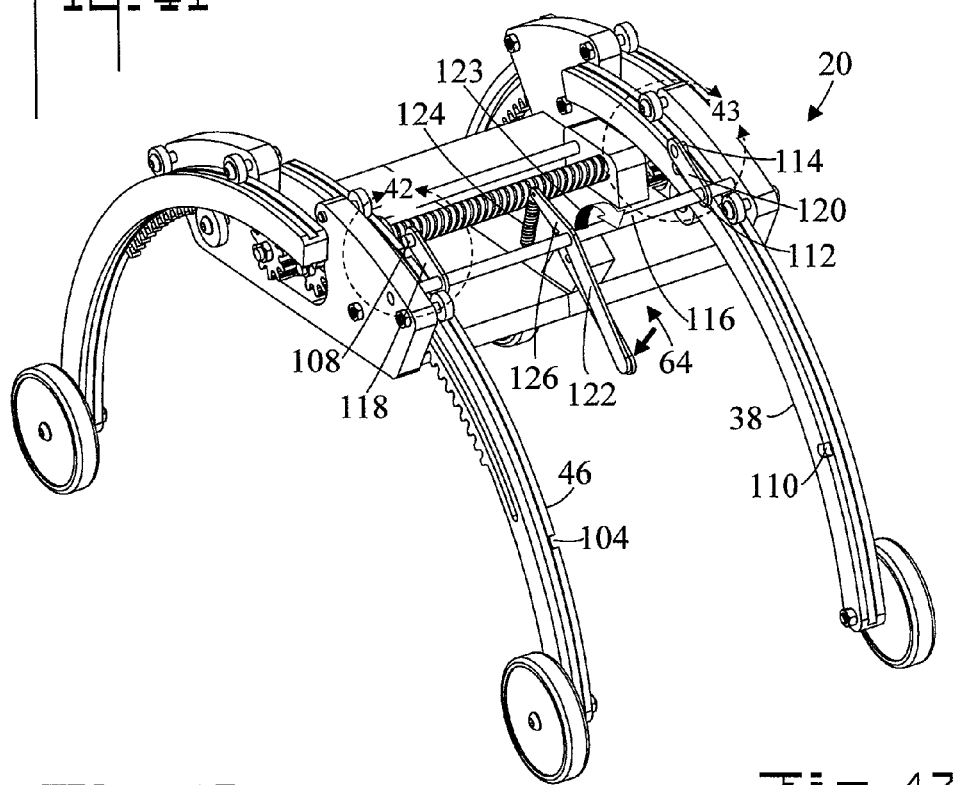
FIG. 41 is a perspective view of the device in the extended position with a locking mechanism in the disengaged position.
Figure 42:
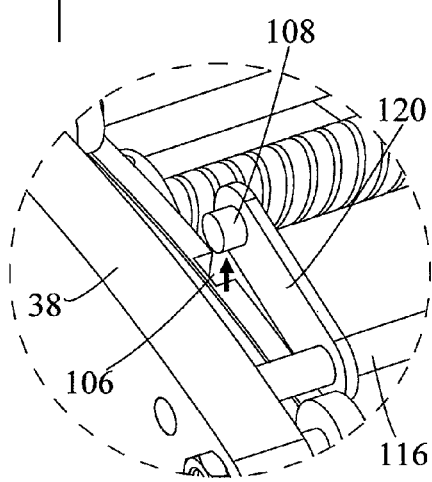
FIG. 42 is an enlarged view of area 42 of FIG. 41.
Figure 43:
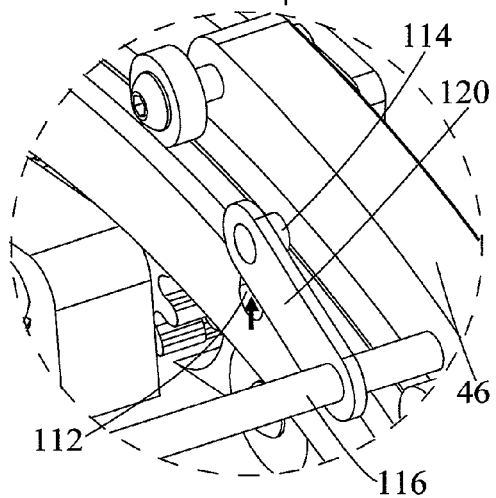
FIG. 43 is an enlarged view of area 43 of FIG. 41.
Figures 44, 45, 46:
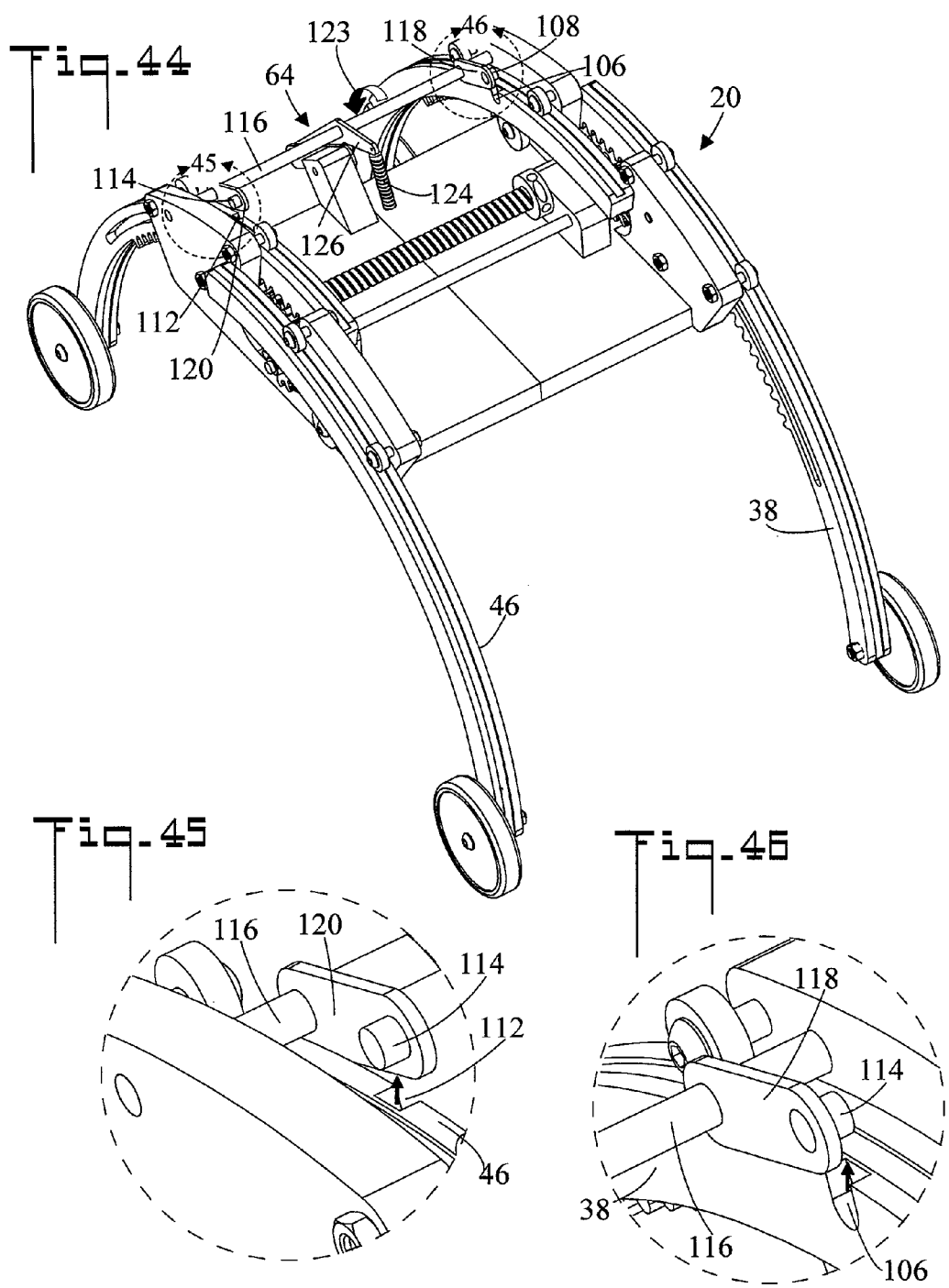
FIG. 44 is an opposite perspective view of the device in the extended position with a locking mechanism in the disengaged position.
FIG. 45 is an enlarged view of area 45 of FIG. 44.
FIG. 46 is an enlarged view of area 46 of FIG. 44.

FIG. 41 is a perspective view of device 20 in the extended position with locking mechanism 64 in the disengaged position. FIG. 42 is an enlarged view of area 42 of FIG. 41, and FIG. 43 is an enlarged view of area 43 of FIG. 41. FIG. 44 is an opposite perspective view of device 20 in the extended position with locking mechanism 64 in the disengaged position. FIG. 45 is an enlarged view of area 45 of FIG. 44, and FIG. 46 is an enlarged view of area 46 of FIG. 44. Shown are third leg 38, fourth leg 46, locking mechanism 64, first notch 104, second notch 106, first stop 108, third notch 110, fourth notch 112, second stop 114, release shaft 116, first arm 118, second arm 120, handle 122, release direction 123, and spring 124.

FIGS. 47 and 48 are perspective and top plan views respectively of another embodiment of device 20 in the partially extended position. A first rod 126 connects distal ends 28 and 36 of first 22 and second 30 curved legs, and a second rod 128 connects distal ends 44 and 52 of third 38 and fourth 46 curved legs. Rods 126 and 128 serve to provide structural support for the legs. Also this embodiment has no wheels, and as such would find application where stationary leg retraction or expansion is desired, such as for a table.

Figure 49:
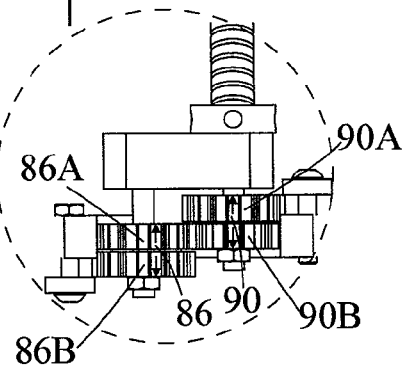
FIG. 49 is a view of area 49 of FIG. 49.

FIG. 49 is a view of area 49 of FIG. 49. First 86 gear comprise two split gears 86A and 86B which are both fixedly connected to shaft 94 in side-by-side relationship (refer to FIG. 28). Similarly, third gear 90 comprises two split gears 90A and 90B which are both connected to shaft 96 in side-by-side relationship (refer to FIG. 28). Second gear 88 and fourth gear 92 are similarly constructed as is shown in FIG. 28. It is also noted that the two split gears 90A and 90B of third gear 90 are offset by one-half tooth. Fourth gear 92 has the same offset as is shown in FIG. 28. This offset arrangement can be the result of a leveling adjustment which is made to ensure that device 20 resides perfectly horizontal upon a support surface. In another embodiment, the gearing assembly is constructed so that such an adjustment is not necessary (refer to FIG. 50).

Figure 50:
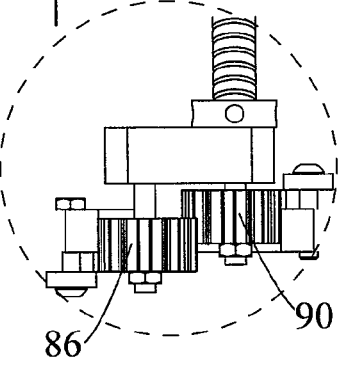
FIG. 50 is a view of another embodiment as in FIG. 49.

FIG. 50 is a view of another embodiment as in FIG. 49. In this embodiment first gear 86, and third gear 90 (as well as second gear 88 and fourth gear 92) are not split, but rather each comprises a single wider gear. Also in this embodiment, since the gears are not split, there exists no offset.

Figure 51:
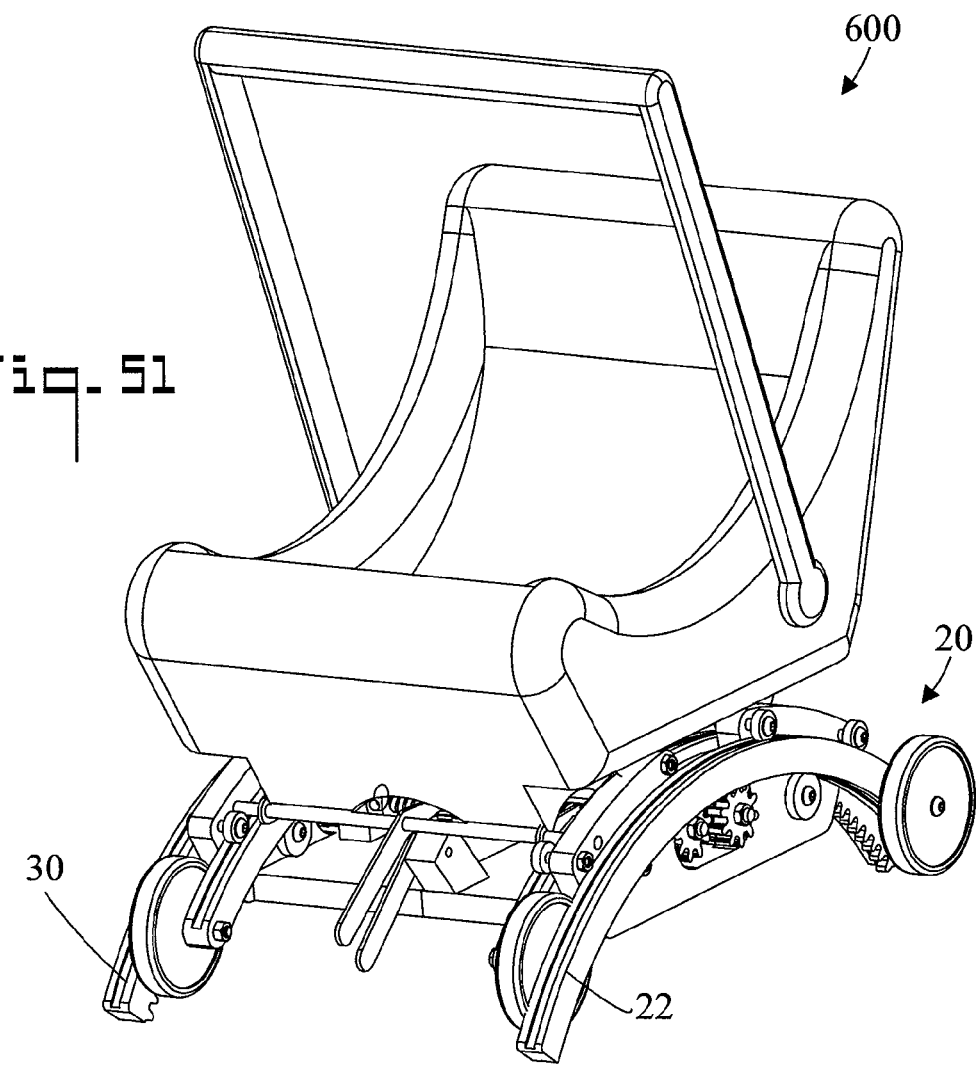
FIG. 51 is a perspective view of the device in the retracted position with an infant seat attached; and, FIG. 52 is a perspective view of the device in the extended position with the infant seat attached.
Figure 52:
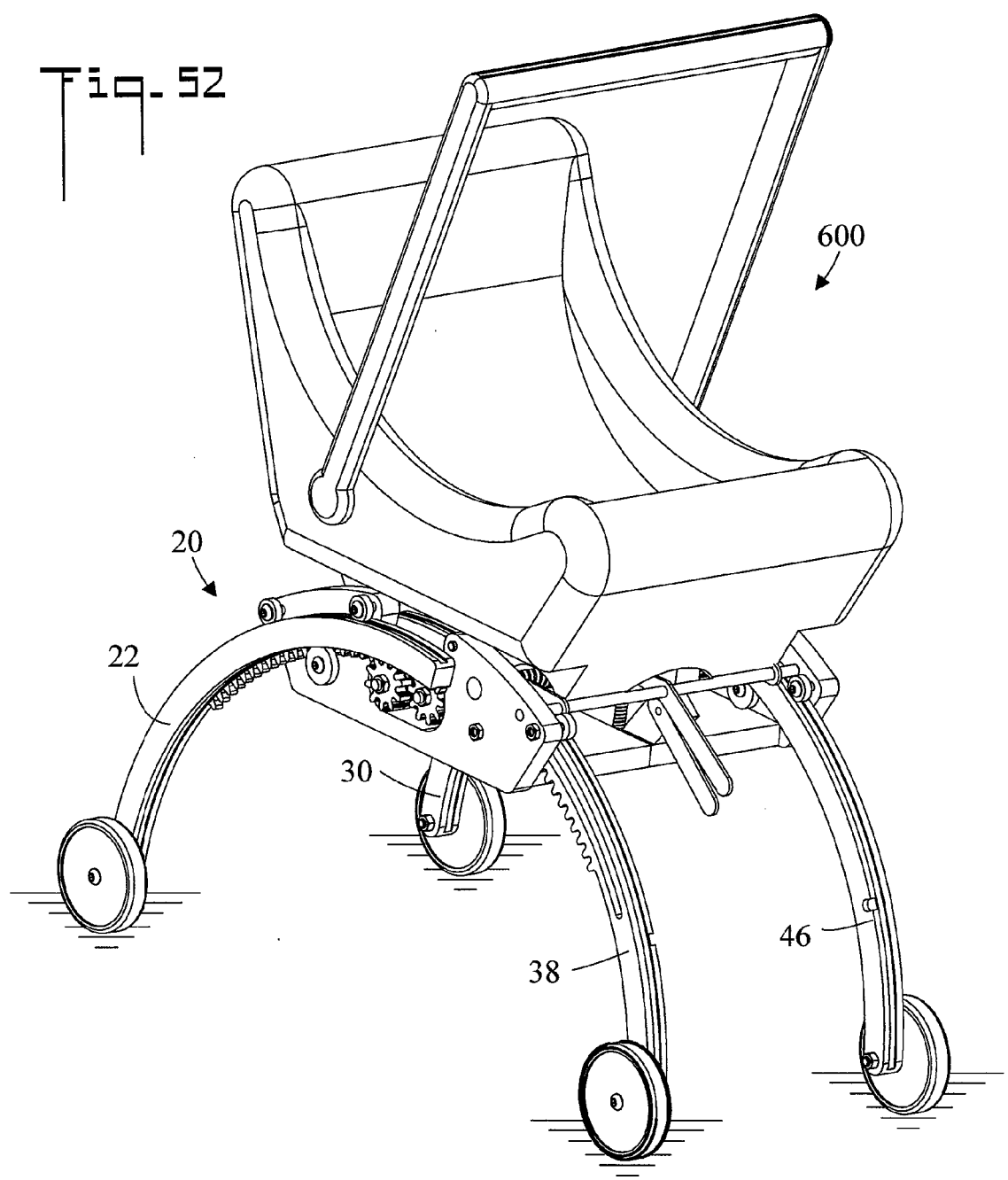

FIG. 51 is a perspective view of one possible application of device 20 in the retracted position with an infant seat 600 attached, and FIG. 52 is a perspective view of device 20 in the extended position with the infant seat 600 attached. The attachment of infant seat 600 to device 20 can be by any convenient mechanical means. When so configured, when legs 22, 30, 38, and 46 of device 20 are placed in the retracted position of FIG. 51, the combination can be placed in a car and used as a car seat. Conversely, when the legs are placed in the extended position of FIG. 52, the combination can be used as a stroller. However, it may be appreciated that other items could be attached to device 20 such as a transport container, another type of seat, a platform, or the like. Also as previously discussed, device 20 can be used without wheels.

In an embodiment, the body of device 20 is fabricated primarily from metal, and the legs are fabricated from a polymer. However, other materials could also be used.

In terms of use, a method for extending and retracting the legs of a device includes: (refer to FIGS. 1-52)

(a) providing a device 20 which has legs which extend and retract, the device 20 including a first curved leg 22 having a first plurality of teeth 24, a proximal end 26, and an opposite distal end 28, a second curved leg 30 having a second plurality of teeth 32, a proximal end 34, and an opposite distal end 36, the second curved leg 30 residing in spaced apart relationship with the first curved leg 22, a third curved leg 38 having a third plurality of teeth 40, a proximal end 42, and an opposite distal end 44, a fourth curved leg 46 having a fourth plurality of teeth 48, a proximal end 50, and an opposite distal end 52, the fourth curved leg 46 residing in spaced apart relationship with the third curved leg 38, a body 54 connected to the first 22, the second 30, the third 36, and the fourth 46 curved legs, and the first 22, the second 30, the third 38, and the fourth 46 curved legs positionable to an extended position away from the body 54 and to a retracted position adjacent to the body 54, the body 54 including a first gear 86 which meshes with the first plurality of teeth 24 of the first curved leg 22, a second gear 88 which meshes with the second plurality of teeth 32 of the second curved leg 30, a third gear 90 which meshes with the third plurality of teeth 40 of the third curved leg 38 and also meshes with the first gear 86, a fourth gear 92 which meshes with the fourth plurality of teeth 48 of the fourth curved leg 46 and also meshes with the second gear 88;

(b) positioning the first curved leg 22, the second curved leg 30, the third curved leg 38, and the fourth curved leg 46 to the retracted position; and, (c) after (b), positioning the first curved leg 22, the second curved leg 30, the third curved leg 38, and the fourth curved leg 46 to the extended position.

The method further including:

in (a), the device 20 including a biasing mechanism 66 which urges the first curved leg 22, the second curved leg 30, the third curved leg 38, and the fourth curved leg 46 to the extended position; and, in (c), the biasing mechanism 66 causing the first curved leg 22, the second curved leg 30, the third curved leg 38, and the fourth curved leg 46 to move to the extended position.

The method further including:

in (a) the device 20 including a locking mechanism 64 which holds the first curved leg 22, the second curved leg 30, the third curved leg 38, and the fourth curved leg 46 in both the retracted position and the extended position;

in (b), the locking mechanism 64 holding the first curved leg 22, the second curved leg 30, the third curved leg 38, and the fourth curved leg 46 in the retracted position; and, in (c), the locking mechanism 64 holding the first curved leg 22, the second curved leg 30, the third curved leg 38, and the fourth curved leg 46 in the extended position.

The method further including:

before (c), disengaging locking mechanism 64.

The embodiments of the device and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the device and method should be construed as limiting the invention to a particular embodiment or combination of embodiments. The scope of the invention is defined by the appended claims.

We claim:

1. Device having legs which extend and retract, comprising:

a first curved leg having a first plurality of teeth, a proximal end, and an opposite distal end;

a second curved leg having a second plurality of teeth, a proximal end, and an opposite distal end, said second curved leg residing in spaced apart relationship with said first curved leg;

a third curved leg having a third plurality of teeth, a proximal end, and an opposite distal end;

a fourth curved leg having a fourth plurality of teeth, a proximal end, and an opposite distal end, said fourth curved leg residing in spaced apart relationship with said third curved leg;

a body connected to said first, said second, said third, and said fourth curved legs;

said first, said second, said third, and said fourth curved legs positionable to an extended position away from said body and to a retracted position adjacent to said body;

a biasing mechanism which urges said first curved leg, said second curved leg, said third curved leg, and said fourth curved leg to said extended position;

said body including a first gear which meshes with said first plurality of teeth of said first curved leg;

said body including a second gear which meshes with said second plurality of teeth of said second curved leg;

said body including a third gear which meshes with said third plurality of teeth of said third curved leg and also meshes with said first gear;

said body including a fourth gear which meshes with said fourth plurality of teeth of said fourth curved leg and also meshes with said second gear;

said first gear connected to a first shaft;

said second gear connected to said first shaft in spaced apart relationship with said first gear;

said third gear connected to a second shaft;
said fourth gear connected to said second shaft in spaced apart relationship with said third gear; and,
said biasing mechanism including a torsion spring which either (1) surrounds said first shaft, said torsion spring having one end which is connected to said first shaft and an opposite end which is connected to said body, or (2) surrounds said second shaft, said torsion spring having one end which is connected to said second shaft and an opposite end which is connected to said body.

2. Device having legs which extend and retract, comprising:
   a first curved leg having a first plurality of teeth, a proximal end, and an opposite distal end;
   a second curved leg having a second plurality of teeth, a proximal end, and an opposite distal end, said second curved leg residing in spaced apart relationship with said first curved leg;
   a third curved leg having a third plurality of teeth, a proximal end, and an opposite distal end;
   a fourth curved leg having a fourth plurality of teeth, a proximal end, and an opposite distal end, said fourth curved leg residing in spaced apart relationship with said third curved leg;
   a body connected to said first, said second, said third, and said fourth curved legs;
   said first, said second, said third, and said fourth curved legs positionable to an extended position away from said body and to a retracted position adjacent to said body;
   a locking mechanism which holds said first curved leg, said second curved leg, said third curved leg, and said fourth curved leg in both said retracted position and said extended position;
   said locking mechanism including;
      said third curved leg having a first notch spaced apart from a second notch;
      a first stop which engages one of said first and said second notches;
      when said third curved leg is in said retracted position, said first stop engaging said first notch;
      when said third curved leg is in said extended position, said first stop engaging said second notch;
      said fourth curved leg having a third notch spaced apart from a fourth notch;
      a second stop which engages one of said third and said fourth notches;
      when said fourth curved leg is in said retracted position, said second stop engaging said third notch;
      when said fourth curved leg is in said extended position, said second stop engaging said fourth notch;
      a release for moving said first stop out of said first and said second notches, and for moving said second stop out of said third and fourth notches;
   said release including;
      a release shaft;
      said first stop connected to said release shaft by a first arm, and said second stop connected to said release shaft by a second arm; and,
      a handle connected to said release shaft, so that said release shaft can be rotated to disengage said first stop from said first notch and from said second notch, and to disengage said second stop from said third notch and said second notch.

* * * * *